United States Patent
Crump et al.

(10) Patent No.: US 10,006,524 B2
(45) Date of Patent: Jun. 26, 2018

(54) INTEGRATED PRESSURE RELIEF VALVE FOR HYDRAULIC TENSIONER

(71) Applicant: BorgWarner Inc., Auburn Hills, MI (US)

(72) Inventors: Matthew W. Crump, Cortland, NY (US); Toru Shinoyama, Yamatokoriyama Nara (JP); Seongdo Hong, Ithaca, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days. days.

(21) Appl. No.: 15/239,045

(22) Filed: Aug. 17, 2016

(65) Prior Publication Data

US 2016/0356365 A1    Dec. 8, 2016

Related U.S. Application Data

(63) Continuation-in-part of application No. 15/039,099, filed as application No. PCT/US2014/066496 on
(Continued)

(51) Int. Cl.
*F16H 7/22*    (2006.01)
*F16H 7/08*    (2006.01)

(52) U.S. Cl.
CPC ... *F16H 7/0848* (2013.01); *F16H 2007/0806* (2013.01); *F16H 2007/0817* (2013.01);
(Continued)

(58) Field of Classification Search
CPC ..... F16H 2007/0806; F16H 2007/0859; F16H 2007/0812; F16H 7/0848; F16H 2007/0814
(Continued)

(56) References Cited

U.S. PATENT DOCUMENTS

| 1,613,145 | A | * | 1/1927 | Trump | F16K 15/042 |
| | | | | | 137/512.1 |
| 2,308,876 | A | * | 1/1943 | Hammett | F16K 15/042 |
| | | | | | 137/493 |

(Continued)

FOREIGN PATENT DOCUMENTS

| DE | 102009049245 | 5/2010 |
| EP | 0919744 | 6/1999 |

(Continued)

OTHER PUBLICATIONS

International Search Report for PCT/2016/030908 dated Aug. 16, 2016.
(Continued)

*Primary Examiner* — Henry Y Liu
(74) *Attorney, Agent, or Firm* — Brown & Michaels, PC

(57) ABSTRACT

An integrated valve for a hydraulic tensioner includes a pressure relief valve with an integrated disk check valve surrounding the pressure relief valve. A hydraulic tensioner includes a housing with a bore and a hollow piston slidably received within the bore. A piston spring biases the piston in a direction toward a power transmission device. The tensioner also includes an integrated check valve in a body of the housing. The integrated check valve includes a pressure relief valve mechanism and a disk check valve mechanism surrounding a circumference of the pressure relief valve mechanism. The pressure relief valve mechanism permits transfer of pressurized fluid from a piston chamber formed by the hollow piston to the source of pressurized fluid and the check valve mechanism permits transfer of pressurized fluid from the source of pressurized fluid to the piston chamber.

18 Claims, 29 Drawing Sheets

Related U.S. Application Data

Nov. 20, 2014, application No. 15/239,045, which is a continuation-in-part of application No. PCT/US2016/030908, filed on May 5, 2016.

(60) Provisional application No. 61/911,102, filed on Dec. 3, 2013, provisional application No. 62/161,619, filed on May 14, 2015.

(52) U.S. Cl.
CPC ............... *F16H 2007/0859* (2013.01); *F16H 2007/0872* (2013.01); *F16H 2007/0893* (2013.01)

(58) Field of Classification Search
USPC ........................................................ 474/110
See application file for complete search history.

(56) References Cited

U.S. PATENT DOCUMENTS

| | | | | |
|---|---|---|---|---|
| 4,018,247 A * | 4/1977 | Carr | ...................... | F16K 15/042 137/512.1 |
| 4,253,524 A * | 3/1981 | Erickson | ................. | E21B 34/06 137/512.1 |
| 4,507,103 A * | 3/1985 | Mittermeier | .......... | F16H 7/0836 474/110 |
| 4,628,957 A * | 12/1986 | Hofer | .................... | F02M 59/462 123/467 |
| 5,183,075 A * | 2/1993 | Stein | ..................... | F02M 59/462 137/493.6 |
| 5,271,429 A * | 12/1993 | Bauer | .................. | B01D 35/147 137/543.23 |
| 5,637,047 A * | 6/1997 | Schulze | ................ | F16H 7/0848 474/110 |
| 5,700,213 A * | 12/1997 | Simpson | ............... | F16H 7/0848 474/110 |
| 5,707,309 A * | 1/1998 | Simpson | .................... | F16H 7/08 474/110 |
| 5,819,794 A * | 10/1998 | Anderson | ................. | F01L 1/02 137/540 |
| 5,967,920 A * | 10/1999 | Dembosky | ................ | F01L 1/02 474/109 |
| 6,193,623 B1 * | 2/2001 | Koch | .................... | F16H 7/0836 474/110 |
| 6,298,873 B1 | 10/2001 | LeVey | | |
| 6,361,458 B1 * | 3/2002 | Smith | .................... | F16H 7/0848 474/109 |
| 6,435,993 B1 * | 8/2002 | Tada | .................... | F16H 7/0836 474/109 |
| 6,537,043 B1 * | 3/2003 | Chen | ..................... | F04C 29/126 137/543.17 |
| 6,811,505 B2 * | 11/2004 | Hashimoto | ........... | F16H 7/0848 474/109 |
| 7,028,708 B1 * | 4/2006 | Langenfeld | ........... | F16K 15/025 137/493.6 |
| 7,174,799 B2 * | 2/2007 | Yoshida | ................ | F16H 7/0836 474/101 |
| 7,258,134 B1 * | 8/2007 | Langenfeld | ........... | F16K 15/025 137/493.6 |
| 7,367,353 B1 * | 5/2008 | Langenfeld | ........... | F16K 15/025 137/493.6 |
| 7,404,776 B2 * | 7/2008 | Yoshida | ................ | F16H 7/0836 474/110 |
| 7,427,249 B2 * | 9/2008 | Yoshida | ................ | F16H 7/0836 474/110 |
| 7,568,497 B1 * | 8/2009 | Langenfeld | ........... | F16K 15/025 137/493.3 |
| 7,775,924 B2 * | 8/2010 | Koch | .................... | F16H 7/0848 251/337 |
| 7,913,715 B2 * | 3/2011 | Martin | .................... | F16K 17/10 137/514.5 |
| 8,002,656 B2 * | 8/2011 | Emizu | ................... | F16H 7/0836 474/109 |
| 8,137,224 B2 * | 3/2012 | Emizu | ................... | F16H 7/0836 474/110 |
| 8,403,783 B2 * | 3/2013 | Wigsten | ................ | F16H 7/0848 474/109 |
| 8,574,106 B2 * | 11/2013 | Botez | .................... | F16H 7/0848 474/110 |
| 8,585,519 B2 * | 11/2013 | Hartmann | .............. | F16H 7/0836 474/110 |
| 8,951,154 B2 * | 2/2015 | Konuma | ................ | F16H 7/0848 474/110 |
| 2002/0022541 A1 * | 2/2002 | Ullein | ................... | F16H 7/0836 474/110 |
| 2004/0266572 A1 * | 12/2004 | Yoshida | ................ | F16H 7/0848 474/110 |
| 2005/0227799 A1 * | 10/2005 | Yoshida | ................ | F16H 7/0848 474/110 |
| 2006/0063625 A1 * | 3/2006 | Emizu | ................... | F16H 7/0836 474/110 |
| 2006/0094549 A1 * | 5/2006 | Yoshida | ................ | F16H 7/0836 474/110 |
| 2008/0261737 A1 * | 10/2008 | Yoshida | ................ | F16H 7/0836 474/110 |
| 2008/0293526 A1 * | 11/2008 | Wigsten | ................ | F16H 7/0848 474/110 |
| 2009/0197721 A1 * | 8/2009 | Emizu | ................... | F16H 7/0836 474/110 |
| 2010/0004080 A1 * | 1/2010 | He | ...................... | F16K 17/0406 474/110 |
| 2011/0237370 A1 * | 9/2011 | Hartmann | ............. | F16H 7/0836 474/110 |
| 2011/0263366 A1 * | 10/2011 | Botez | .................... | F16H 7/0848 474/110 |
| 2013/0017913 A1 * | 1/2013 | Hartmann | ............. | F16H 7/0848 474/110 |
| 2013/0313057 A1 * | 11/2013 | Tsukahara | ................ | F16F 9/19 188/313 |

FOREIGN PATENT DOCUMENTS

| | | |
|---|---|---|
| EP | 0 645 289 | 8/2001 |
| GB | 2 410 332 | 7/2005 |
| WO | 2012106093 | 8/2012 |
| WO | 2012118723 | 9/2012 |
| WO | 2015048560 | 4/2015 |
| WO | 2015084592 | 6/2015 |
| WO | 2015110104 | 7/2015 |

OTHER PUBLICATIONS

International Search Report for PCT/US2014/066496 dated Mar. 16, 2015.

* cited by examiner

INTEGRATED PRESSURE RELIEF VALVE FOR HYDRAULIC TENSIONER

REFERENCE TO RELATED APPLICATIONS

This application is a continuation in part application of U.S. application Ser. No. 15/039,099, entitled "HIGH FLOW AND QUICK RESPONSE DISK STYLE CHECK VALVE FOR HYDRAULIC TENSIONER", filed May 25, 2016, which is a national stage application of PCT/US2014/066496, entitled "HIGH FLOW AND QUICK RESPONSE DISK STYLE CHECK VALVE FOR HYDRAULIC TENSIONER", filed Nov. 20, 2014, which claims priority to Provisional Application No. 61/911,102, filed Dec. 3, 2013, entitled "HIGH FLOW AND QUICK RESPONSE DISK STYLE CHECK VALVE FOR HYDRAULIC TENSIONER".

This application is also a bypass continuation in part of PCT/US2016/30908, entitled "INTEGRATED DISK CHECK VALVE IN A HYDRAULIC TENSIONER WITH METERED BACKFLOW", filed May 5, 2016, which claims priority to a Provisional Application No. 62/161,619, filed May 14, 2015, entitled "INTEGRATED DISK CHECK VALVE IN A HYDRAULIC TENSIONER WITH METERED BACKFLOW".

The benefit under 35 USC § 119(e) of the United States provisional application is hereby claimed, and the aforementioned applications are hereby incorporated herein by reference.

BACKGROUND OF THE INVENTION

Field of the Invention

The invention relates to an integrated pressure relief valve apparatus and more particularly to a hydraulic tensioner for applying proper tension to an endless, flexible, power transmission member, such as a timing belt or timing chain, encircling a driving sprocket and at least one driven sprocket as used for an internal combustion engine of a motor vehicle.

Description of Related Art

Chain tensioners in engines are used to control the power transmission chains as the chain travels around a plurality of sprockets. The slack of the chain varies as the temperature in an engine increases and as the chain wears. When a chain wears, the chain elongates and the slack in the chain increases. The increase in slack may cause noise, slippage, or tooth jumping between the chain and the sprocket teeth. If the increase of the slack of the chain is not taken up, by a tensioner for example, in an engine with a chain driven camshaft, the engine may be damaged because the camshaft timing is misaligned by several degrees due to slippage or tooth jumping.

The performance of a hydraulic tensioner is based on two primary functions of a check valve. First, oil must flow through a check valve and into a high pressure chamber of the tensioner as the piston extends to take up chain slack. If the flow restriction of the check valve is too great, the piston will not have enough oil volume to support its extended length. Secondly, as the chain begins to push the piston back into the tensioner the oil wants to flow back out of the check valve. At this point, the oil passage must be sealed off. Current technology utilizes a single check valve ball for sealing this passage. If the response time is too slow it takes longer to build up the necessary pressure to support the piston and chain control becomes an issue.

Hydraulic tensioner check valves have been previously disclosed in U.S. Pat. No. 7,404,776; U.S. Pat. No. 7,427,249; and U.S. Published Application No. 2008/0261737. The current singular check valve ball technology is limited in that it has two methods of increasing flow. The first option is to increase the diameter of the ball which increases the conical flow area between the seat and ball. The adverse effect of increasing the ball diameter is that the ball's mass also increases. As the mass of the ball increases the response time to reverse the direction of the ball to seal off the inlet aperture also increases. The second method of increasing the flow is to increase the travel distance of the ball. Allowing the ball to move further away from the seat will increase the conical flow area, but it also means response time will increase. Neither of these methods provides variable flow.

Ball check valves have been previously disclosed in U.S. Pat. No. 1,613,145; U.S. Pat. No. 2,308,876; U.S. Pat. No. 4,018,247; and U.S. Pat. No. 4,253,524. These non-analogous patents pertain to a casing string of an oil well, a high speed gas compressor, and high pressure reciprocating oil well pumps. While the earliest of these patents was issued in 1927, known hydraulic tensioners have not included variable valve sealing surfaces for a timing chain or timing belt assembly. It is believed that this lack of adaptation is due to the difficulty in designing a cost effective package to contain and control valve sealing surfaces in a small, compact, lightweight configuration.

U.S. Pat. Nos. 5,700,213 and 5,707,309 show pressure relief valves for hydraulic tensioners. The valve designs in these patents suffer from the same difficulties discussed above in creating a small, compact lightweight valve that is also cost effective.

SUMMARY OF THE INVENTION

An integrated valve includes a pressure relief valve with an integrated disk check valve surrounding the pressure relief valve.

In one embodiment, an integrated check valve for a hydraulic tensioner includes a backflow pressure relief valve mechanism and a forward flow check valve mechanism. The backflow pressure relief valve mechanism includes a hollow pressure relief body defining a chamber, the pressure relief body having a first end with an aperture, a second end, and a length extending from a bottom portion, the bottom portion defining at least one hole, a valve member received in the first end of the chamber, a pressure relief retainer received in the second end of the chamber, and a first biasing member received in the chamber having a second end contacting the pressure relief retainer and a first end contacting the valve member, the first biasing member biasing the valve member to a position in which the valve member seals the aperture of the pressure relief body. The forward flow check valve mechanism includes a check valve retainer surrounding a portion of the length of the hollow pressure relief body comprising a retainer sidewall with through holes and a retainer top wall, where the check valve retainer defines a cavity between the pressure relief valve body and the check valve retainer, at least one disk check valve received within the cavity and extending along the retainer sidewall and a portion of the length of the pressure relief body, and a second biasing member received in the cavity and located between the disk check valve and the pressure relief body.

In another embodiment, an integrated check valve for a hydraulic tensioner includes a backflow pressure relief valve mechanism and a forward flow check valve mechanism. The backflow pressure relief valve mechanism includes a hollow pressure relief body defining a chamber, the pressure relief body having a first end with an aperture, a second end, and a length extending from a bottom portion, the bottom portion defining at least one hole, a valve member received in the first end of the chamber, a pressure relief retainer received in the second end of the chamber, and a first biasing member received in the chamber having a second end contacting the pressure relief retainer and a first end contacting the valve member, the first biasing member biasing the valve member to a position in which the valve member seals the aperture of the pressure relief body. The forward flow check valve mechanism includes a check valve retainer surrounding a portion of the length of the hollow pressure relief body comprising a retainer sidewall with through holes and a retainer top wall, where the check valve retainer defines a cavity between the pressure relief valve body and the check valve retainer, at least one disk check valve received within the cavity and extending along a portion of the length of the pressure relief body, and a second biasing member received in the cavity and located between the retainer sidewall and the disk check valve.

In another embodiment, a hydraulic tensioner for an endless loop, flexible, power transmission member for an internal combustion engine of a motor vehicle includes a housing having a bore, the bore having an inner surface, the housing having an inlet in communication with a source of pressurized fluid, a hollow piston slidably received within the bore, the piston having an inner surface and an outer surface, a piston spring biasing the piston in a direction toward the power transmission device, a hydraulic pressure chamber formed between the inner surface of the bore, the inner surface of the hollow piston, and an integrated check valve in a body of the housing, comprising a pressure relief valve mechanism and a disk check valve mechanism surrounding a circumference of the pressure relief valve mechanism. The pressure relief valve mechanism permits transfer of pressurized fluid from the hydraulic pressure chamber to the source of pressurized fluid and the check valve mechanism permits transfer of pressurized fluid from the source of pressurized fluid to the hydraulic pressure chamber.

DETAILED DESCRIPTION OF THE INVENTION

Figure 1:
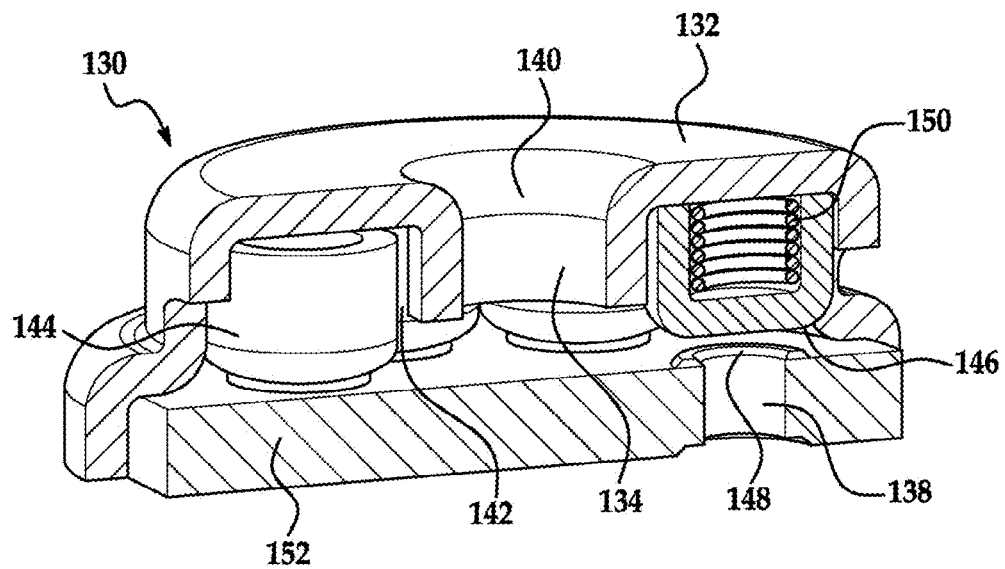
FIG. 1 shows a cross sectional view of a high flow and quick response check valve having a plurality of check valve disks, each valve disk having a generally planar valve sealing surface.

The term "belt" or "chain", as used interchangeably herein, is any power transmission member forming an endless loop and constructed of flexible material or of articulated rigid links to permit the member to conform to a radius of curvature of a pulley or sprocket drive face and intended, in use, to be driven in an endless path; and, by contact with the pulley or sprocket drive face, to transmit power to or extract power from the pulley or sprocket. The term a "pulley" or "sprocket", as used interchangeably herein, is a device rotatable about an axis and having a drive face radially spaced from the axis of rotation for intended power transferring engagement with a belt or chain to drive the belt or chain on an endless path or to extract power from the belt or chain to drive an output load device. The term "guide roll" as used herein is a device rotatable about an axis and having a belt or chain-contacting face radially spaced from the axis of rotation for intended engagement with the belt or chain to aid in directing the belt or chain along an intended path of travel. A guide roll, as distinguished from a pulley or sprocket, is not intended to provide driving power to, or extract power from, a belt or chain. The term "tensioning arm" as used herein is a member other than a pulley or sprocket engageable with a belt or chain, and which is adjustable or relatively movable with respect to the belt or chain in a direction which causes an increase or decrease in tensile stress in the belt or chain or a take-up or any undesirable belt or chain slack to maintain a desirable drive traction between the belt or chain and the pulley or sprocket drive face. A tensioning arm, as distinguished from a guide roll, has a non-rotatable face portion for contacting the belt or chain, whereby the belt or chain slides over the face portion of the tensioning arm. The term "hydraulic tensioner" or "tension drive mechanism" as used herein applies a force for actuating the tensioning arrangement and is derived from or transmitted via the exertion of force on a fluid.

Current hydraulic tensioners use a check valve having a singular check valve ball to control the unidirectional flow of oil into a high pressure chamber of a tensioner. In certain tensioner applications it may be beneficial to vary the stiffness of the piston. It would be desirable to provide a check valve for a hydraulic tensioner which encompasses variable flow characteristics for sealing the inlet oil passage to improve the performance of the hydraulic tensioner. To overcome the limitation of current technology, a check valve can include a plurality of check valve disks in unique patterns of size, allowable travel, and biasing spring forces to achieve variable flow at different inlet fluid pressures as a means of changing piston stiffness. Using multiple smaller and lighter check valve disks can achieve the same or greater flow as one large check valve ball. Additionally, if the proper number of check valve disks is selected, the travel of the disks can be reduced. Since the mass of each disk is greatly reduced, as well as the travel distance, the response time to seal off the fluid inlet is improved. The multiple disk check valve provides a cost effective design to contain and control the plurality of disks in a small, compact, lightweight configuration. To overcome the limitation of current technology, a check valve for a hydraulic tensioner can include a single check valve disk or washer to increase the flow area through the inner diameter of the check valve. The disk or washer can operably engage with respect to a plurality of apertures of varying shapes and/or sizes for optimization of fluid flow through the check valve.

A high flow and quick response check valve can include a housing defining a plurality of inlet passages and an outlet passage in fluid communication with the plurality of inlet passages through a cavity defined by the housing. The check valve can include a plurality of valve seats corresponding to a plurality of inlet passages. The check valve can include at least one valve disk having at least one corresponding valve sealing surface engageable with at least one of the plurality of valve seats. The at least one valve disk can be received within the cavity for reciprocal movement with respect to at least one of the plurality of valve seats and can normally be biased toward at least one of the plurality of valve seats. The check valve can include at least one biasing member received within the cavity of the housing for normally biasing the at least one valve disk toward the corresponding at least one of the plurality of valve seats into a seated sealed position to prevent fluid flow, while allowing for movement of the at least one valve disk to an unseated or open position located at a position spaced from the corresponding at least one of the plurality of valve seats allowing fluid flow through the check valve.

An integrated valve includes a pressure relief valve with an integrated disk check valve surrounding the pressure relief valve. These low cost and space saving valves have a one-way valve function and a pressure relief function which are separated The disk check valve is placed around the pressure relief valve on a circumference to minimize packaging space. Simplified component parts lead to low cost valves.

Figure 14:
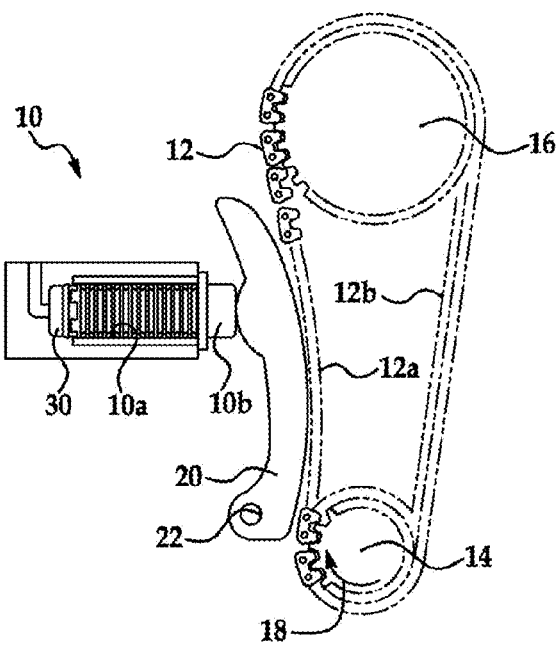
FIG. 14 shows a simplified schematic of a hydraulic tensioner for an endless loop, flexible, power transmission member, such as a timing chain or timing belt, for an internal combustion engine, including a high flow and quick response check valve having at least one check valve disk according to the present invention.

Referring now briefly to FIG. 14, a hydraulic tensioner 10 is schematically illustrated for an endless loop, flexible, power transmission member 12 for an internal combustion engine of a motor vehicle. The power transmission member 12 encircles a drive sprocket 14 driven by a drive shaft, such as a crank shaft of the engine, and at least one driven sprocket 16 supported from a driven shaft, such as a cam shaft of the engine. A guide roll can also be provided, if desired. The power transmission member 12 passes over the drive sprocket 14 and driven sprockets 16 to define a slack strand 12*a* and a taut strand 12*b*, when driven in rotation as shown by arrow 18. On the outside of at least one of the slack strand 12*a* and the taut strand 12*b* of the power transmission member 12, at least one tensioning arm 20 is positioned with a face assembly including a shoe for sliding engagement with the power transmission member 12. The tensioning arm 20 can rotate about pivot 22 in response to force exerted by the tension drive mechanism or hydraulic tensioner 10. Rotation of the tensioning arm 20 about the pivot 22 applies tension to the power transmission member 12 to remove excess slack. In operation, the variable flow check valve 30 controls the unidirectional flow of hydraulic oil into a high pressure chamber 10*a* of a hydraulic tensioner 10 to support a piston 10*b* in operable engagement with the tensioning arm 20 to maintain tension on the power transmission member 12 in order to remove excess slack. In other words, as pressure increases beyond the check valve biasing force of at least one of the valve disk members of check valve 30, hydraulic oil flows through the at least one valve seat opening of the check valve 30 and into a high pressure chamber 10*a* of the tensioner 10 as the piston 10*b* extends to take up slack in the power transmission member 12. It should be recognized that the hydraulic tensioner 10 disclosed below can be used in other alternative configurations of tensioning arms without departing from the spirit or scope of the present invention, and that the illustrated configuration is by way of example only, and is not to be considered a limitation of the invention.

FIGS. 1-13 show a high flow and quick response, and/or variable flow, check valve 130, 230, 330, 430 for a hydraulic tensioner 10. The check valve 130, 230, 330, 430 can include a housing 132, 232, 332, 432 defining a plurality of inlet passages 138, 238, 338, 438 for receiving hydraulic oil, an outlet passage 140, 240, 340, 440, and defining an internal cavity 142, 242, 342, 442. The outlet passage 140, 240, 340, 440 can be in fluid communication with the plurality of inlet passages 138, 238, 338, 438 through the internal cavity 142, 242, 342, 442. The check valve 130, 230, 330, 430 can include a plurality of valve seats 148, 248, 348, 448 corresponding to the plurality of inlet passages 138, 238, 338, 438. The plurality of valve seats 148, 248, 348, 448 can be located within the internal cavity 142, 242, 342, 442. The check valve 130, 230, 330, 430 can include at least one valve disk 144, 244, 344, 444 and at least one biasing member 150, 250, 350, 450. Each of the at least one valve disk 144, 244, 344, 444 can have at least one valve sealing surface 146, 246, 346, 446 and can be received within the internal cavity 142, 242, 342, 442 of the housing 132, 232, 332, 432 for reciprocal movement towards and away from the corresponding at least one of the plurality of valve seats 148, 248, 348, 448. At least one biasing member 150, 250, 350, 450 can also be received within the cavity 142, 242, 342, 442 for normally biasing at least one valve disk 144, 244, 344, 444 toward the corresponding at least one valve seat 148, 248, 348, 448 and a seated, sealed position, while allowing for the movement of at least one valve disk 144, 244, 344, 444 from the seated sealed position to an unseated position spaced from the corresponding at least one of the plurality of valve seats 148, 248, 348, 448 allowing fluid flow in response to a difference in fluid pressure. In other words, when fluid pressure acting against the valve sealing surface of the valve disk is greater than the spring force of the biasing member, the fluid pressure moves the valve disk from the seated position to the unseated position allowing fluid flow therethrough.

By way of example and not limitation, the plurality of inlet passages 138, 238, 338, 438 can be defined by a plate 152, 252, 352, 452 formed of a stamped sheet metal material. The plurality of valve seats 148, 248, 348, 448 can be formed in the plate 152, 252, 352, 452, or can be formed of an injection molded plastic overmolded with respect to the corresponding plurality of inlet passages 138, 238, 338, 438 located on the plate 152, 252, 352, 452. The housing 132, 232, 332, 432 can be formed of an injection molded plastic to define the cavity 142, 242, 342, 442 when assembled with respect to the plate 152, 252, 352, 452. At least one valve disk 144, 244, 344, 444, and at least one biasing member 150, 250, 250, 450 can be assembled within the internal cavity 142, 242, 342, 442 defined between the assembled housing 132 232 332, 432 and plate 152, 252, 352, 452. The outlet passage 140, 240, 340, 440 formed in the housing 132, 232, 332, 432 can be in fluid communication with the plurality of inlet passages 138, 238, 338, 438 through the plurality of valve seats 148, 248, 348, 448 of the at least one plate 152, 252, 352, 452 and through the internal cavity 142, 242, 342, 442 defined between the housing 132, 232, 332, 432 and the plate 152, 252, 352, 452. At least one biasing member 150, 250, 350, 450 can be formed as a helically coiled compression spring as best seen in FIGS. 1-4, and/or can be formed of a stamped sheet metal material such as a leaf, or cantilevered, spring as best seen in FIGS. 5A and 5C.

Figure 2:
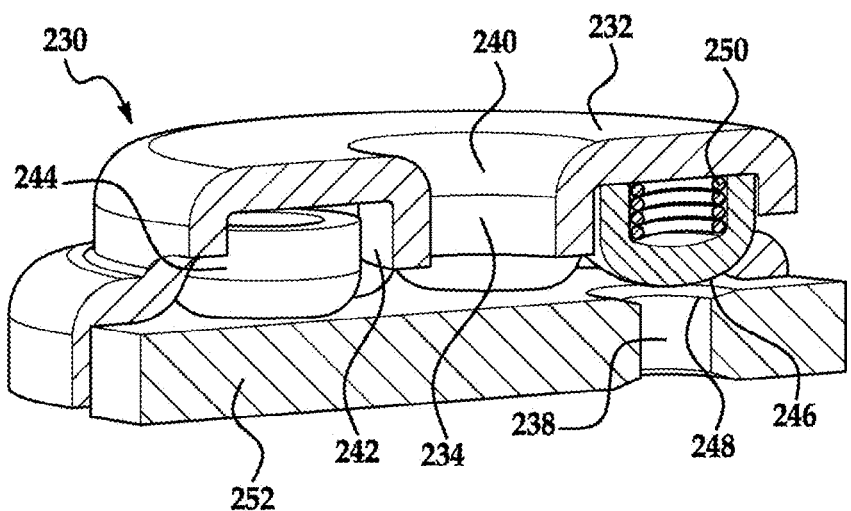
FIG. 2 shows a cross sectional view of a high flow and quick response check valve having a plurality of check valve disks, each valve disk having a generally curved valve sealing surface.

Referring now to FIGS. 1-2, the present invention can include a plurality of valve disks 144, 244 as illustrated. The hydraulic tensioner 10 as illustrated can overcome the limitations of current technology by incorporating the use of a plurality of valve disks 144, 244, where each valve disk 144, 244 has a corresponding valve sealing surface 146, 246 engageable with a corresponding valve seat 148, 248. The housing 132, 232 can define a plurality of inlet passages 138, 238, an outlet passage 140, 240, and an internal cavity 142, 242 defined between the housing 132, 232 and the plate 152, 252. By way of example and not limitation, the outlet passage 140, 240 can be defined by an interior surface 134, 234 of the housing 132, 232 extending inwardly and into the cavity 142, 242 for a more compact check valve configuration. It should be recognized by those skilled in the art that the outlet passage 140, 240 can be defined by an interior surface of the housing extending outwardly away from the cavity 142, 242 similar to FIGS. 3 and 4, if desired. The plurality of inlet passages 138, 238 can be formed in the plate 152, 252. The plurality of valve seats 148, 248 corresponding to the plurality of inlet passages 138, 238 can be formed in the plate 52, 252 and located within the internal cavity 142, 242. The internal cavity 142, 242 can also receive the plurality of valve disks 144, 244 and at least one biasing member 150, 250 for each valve disk 144, 244.

Figures 10, 11, 12, 13:
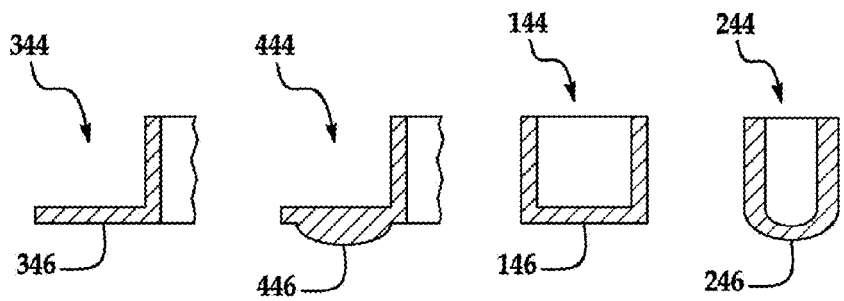
FIG. 10 shows a detail cross sectional view of a portion of a single valve disk having a generally planar valve sealing surface.
FIG. 11 shows a detail cross sectional view of a portion of a single valve disk having a generally curved valve sealing surface.
FIG. 12 shows a detail side view of one of the plurality of valve disks having a generally planar valve sealing surface.
FIG. 13 shows a detail side view of one of the plurality of valve disks having a generally curved valve sealing surface.

Referring now to FIG. 1, at least one of the plurality of valve disks 144 can have a planar sealing surface 146 for sealing engagement with the corresponding valve seat 148. FIG. 12 is a detail view illustrating a cross section of at least one valve disk 144 having a planar sealing surface 146 with a generally planar shaped surface for sealing engagement with the corresponding valve seat 148 according to the check valve 130 illustrated in FIG. 1.

Referring now to FIG. 2, at least one of the plurality of valve disks 244 can have a valve sealing surface 246 which is generally curved or generally cupped in shape. FIG. 13 is a detail view illustrating a cross section of at least one valve disk 244 having a valve sealing surface 246 with a generally curved shaped, or generally cupped shaped, surface for sealing engagement with the corresponding valve seat 248.

Figure 7:
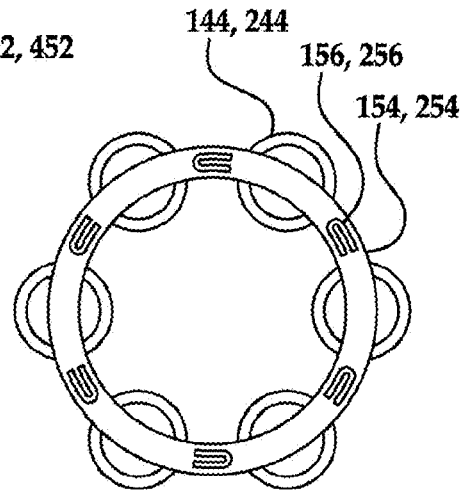
FIG. 7 shows a top view of the plurality of check valve disks, the connecting member, and the plurality of spring levers as shown in FIGS. 5A and 5C.

The plurality of valve disks 144, 244 illustrated in FIGS. 1-2 can have uniform or independent reciprocal movement with respect to the plurality of valve seats 148, 248. Referring to FIG. 5A, the valve disks 144, 244 can be held or restrained with respect to one another in order to provide uniform displacement of valve members simultaneously within the cavity 142, 242 by a connecting member 154, 254. The connecting member 154, 254 can be a stamped metal preform with injection molded valve members formed with respect thereto, or can be formed as an integral injection molded plastic piece with the connecting member and valve members formed simultaneously into a single unitary valve disk member for synchronized reciprocal movement within the cavity 142, 242 of the housing 132, 232. Each valve disk 144, 244 can be fixedly connected to the connecting member 154, 254. As illustrated in detail in FIG. 5C, the biasing member 150, 250 in the depicted check valves can use a connecting member 154, 254 formed with a plurality of spring levers 156, 256 located on the connecting member 154, 254 for biasing engagement between the connecting member 154, 254 and the housing 132, 232, providing for uniform reciprocal movement of the plurality of valve disks 144, 244 with respect to the plurality of valve seats 148, 248. The plurality of spring levers 156, 256 can be used for uniformly biasing the plurality of valve disks 144, 244 toward a seated position against the corresponding plurality of valve seats 148, 248 and allowing for the uniform movement of the plurality of valve disks 144, 244 to an unseated position spaced from the plurality of valve seats 148, 248 allowing fluid flow. The plurality of valve disks 144, 244, the connecting member 154, 254, and the plurality of spring levers 156, 256 can be received within the cavity 142, 242. FIG. 7 illustrates a top view of the plurality of valve disks 144, 244, the connecting member 154, 254, and the plurality of spring levers 156, 256.

Figure 8:
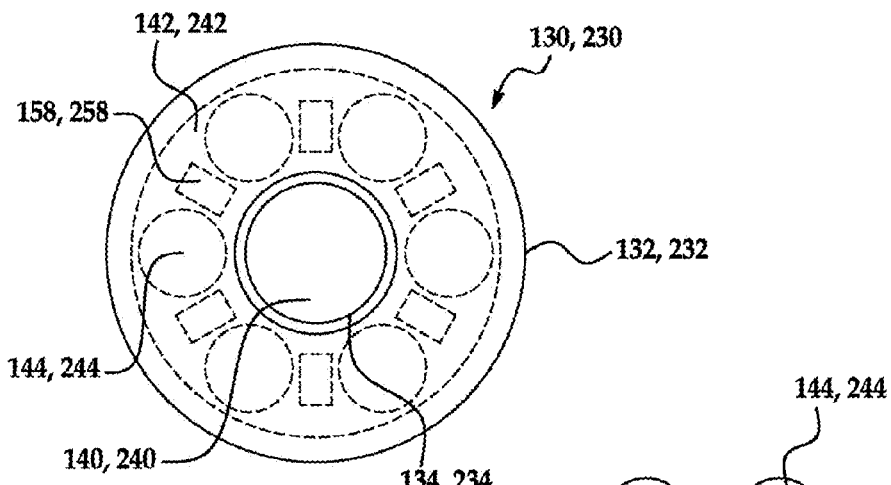
FIG. 8 shows a top view of the check valve illustrating the housing having a plurality of compartment tabs and a plurality of individual, separate check valve disks inserted in the housing for independent movement with respect to one another, where different spring forces can be provided acting to bias each individual check valve disk toward a corresponding valve seat to a seated, sealed position.
Figure 9:
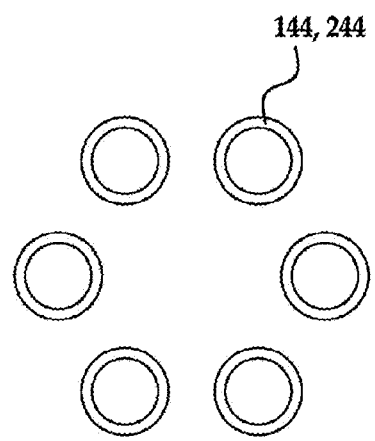
FIG. 9 shows a top view of the plurality of individual separate check valve disks.

As best seen in FIGS. 8-9, a plurality of separate individual valve disks 144, 244 can be compartmentalized for separate individual movement within the housing 132, 232 with inwardly extending or projecting compartment tabs 158, 258 providing for independent movement of each valve disk 144, 244. The compartment tabs 158, 258 can be formed as part of the cover 132 and/or as part of the plate 152. As illustrated in FIG. 8, the housing 132, 232 can have a plurality of compartment tabs 158, 258 adjacent to each valve disk 144, 244. The plurality of compartment tabs 158, 258 can be molded within the housing 132, 232. Each compartment tab 158, 258 can guide at least one valve disk 144, 244 during displacement with respect to the corresponding valve seat 148, 248 and can allow for the reciprocal movement of at least one valve disk 144, 244 with respect to the corresponding valve seat 148, 248. The plurality of compartment tabs 158, 258 can allow for the separate, independent movement of each valve disk 144, 244. At least one biasing member 150, 250 can be provided for biasing each valve disk 144, 244 normally toward a seated position against the corresponding valve seat 148, 248 and allowing for the movement of at least one valve desk 144, 244 to an unseated or open position spaced from the corresponding valve seat 148, 248 allowing fluid flow therethrough. The at least one biasing member 150, 250 can be in the form of at least one compression spring operably engageable between the at least one valve disk 144, 244 and the housing 132, 232. The compression spring can be compressed to allow the at least one valve disk 144, 244 to move to an unseated position spaced from the corresponding valve seat 148, 248 in response to fluid pressure acting on the surface of the valve disk 144, 244.

The check valves 130, 230 illustrated in FIGS. 1-2 can increase flow and response time within a hydraulic tensioner 10. By using a plurality of valve disks 144, 244 for sealing the plurality of valve seats 148, 248, greater flow can be achieved as compared with one large check valve ball. Using a plurality of light weight valve disks can also decrease the response time required for movement of the valve disk 144, 244 with respect to the corresponding one of the plurality of inlet passages 138, 238. Additionally, depending on the number of valve disks 144, 244 selected, the reciprocal travel distance of each valve disk 144, 244 can be reduced. The valve disks 144, 244 offer the advantage of requiring a smaller housing 132, 232, providing for a compact check valve 130, 230.

Figure 3:
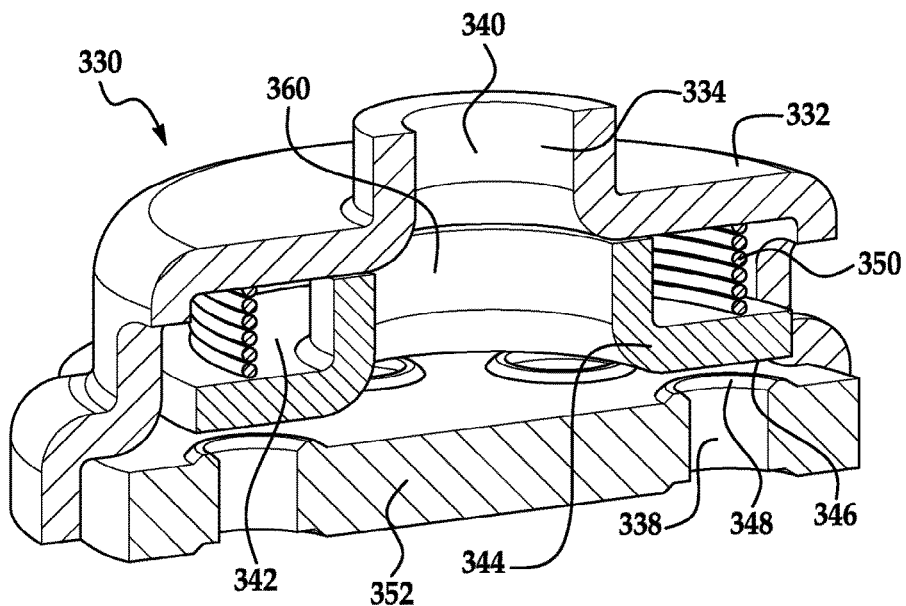
FIG. 3 shows a cross sectional view of a high flow and quick response check valve having a single check valve disk or washer with a generally planar valve sealing surface.
Figure 4:
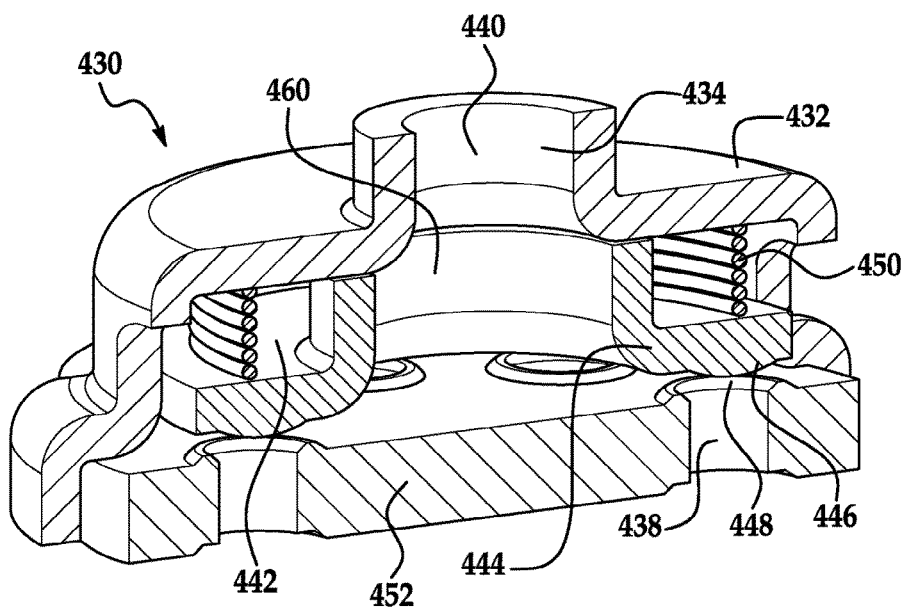
FIG. 4 shows a cross sectional view of a high flow and quick response check valve having a single check valve disk or washer with at least one generally curved valve sealing surface.
Figure 5A:
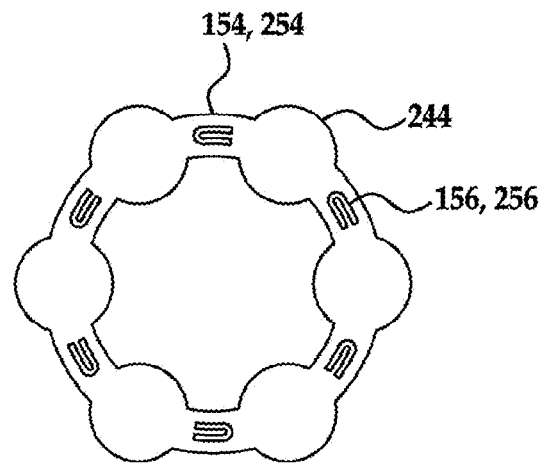
FIG. 5A shows a simplified schematic illustrating a plurality of check valve disks, a connecting member assembling the plurality of check valve disks into a single unitary valve member, and a plurality of spring levers located at angularly spaced positions about a circumference of the connecting member between adjacent pairs of connected check valve disks.
Figure 5B:
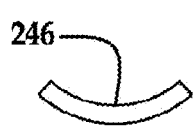
FIG. 5B shows a simplified schematic of a check valve disk having a generally curved valve sealing surface.
Figure 5C:
FIG. 5C shows a simplified schematic of one of the plurality of spring levers as shown in FIG. 5A.
Figure 6:
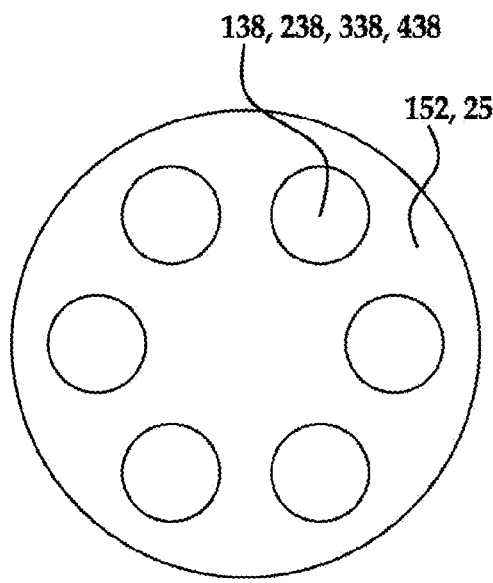
FIG. 6 shows a bottom view of the high flow and quick response check valve illustrating the plurality of inlet passages.

Referring now to FIGS. 3-4, check valves 330, 430 are illustrated using a single valve disk 344, 444. The single valve disk 344, 444 can have a plurality of generally planar valve sealing surfaces 346 as best seen in FIG. 3, or a plurality of generally curved, or generally cupped, valve sealing surfaces 446 as best seen in FIG. 4. A housing 332, 432 can be provided to enclose the valve disks 344, 444. The housing 332, 432 can define a plurality of inlet passages 338, 438, an outlet passage 340, 440, and a cavity 342, 442. The outlet passage 340, 440 can be defined by the interior surface 334, 434 of the housing 332, 432 extending outwardly and away from the cavity 342, 442, decreasing any resistance of the housing 332, 432 against flow from the plurality of inlet passages 338, 438. It should be recognized by those skilled in the art that the outlet passage 340, 440 can be defined by an interior surface of the housing extending inwardly into the cavity 342, 442 similar to that illustrated in FIGS. 1 and 2, if desired. The plurality of inlet passages 338, 438 can be formed in the plate 352, 452. The plurality of valve seats 348, 448 corresponding to the plurality of inlet passages 338, 438 can be formed in the plate 352, 452, which is assembled with respect to the housing 332, 432 to define the cavity 342, 442. The cavity 342, 442 can also receive and enclose the single valve disk 344, 444 and at least one biasing member 350, 450. The single valve disk 344, 444 can be in the form of a cylinder having an outwardly extending flange or washer adjacent one end to define at least one central opening 360, 460.

As illustrated in FIG. 3, the single valve disk 344 can have a plurality of planar valve sealing surfaces 346 formed as a single generally planar surface as best seen in FIG. 10 to engage and seal the corresponding plurality of valve seats 348. As illustrated in FIG. 4, the single valve disk 444 can have a plurality of valve sealing surfaces 446 formed as a single generally planar disk with a plurality of complementary generally curved, or generally cupped, valve sealing surfaces located on the generally planar disk as best seen in FIG. 11 to engage and seal the corresponding valve seats 448. The complementary curved surfaces can take the form of cupped edges for guiding valve sealing surface engagement with the corresponding valve seat. At least one biasing member 350, 450 can be provided for biasing the single valve disk 344, 444 normally toward a seated sealed position against the plurality of valve seats 348, 448 and for allowing movement from the seated and sealed position to an unseated or open position spaced from the valve seat 348, 448 allowing fluid flow. The biasing member 350, 450 can be a single compression spring engageable between the single valve disk 344, 444 and the housing 332, 432. An advantage of the single valve disk configuration is an increased flow concentrated through an inner diameter of the housing 332, 432. By way of example and not limitation, the illustrated configurations shown in FIGS. 3-4 depict the single valve disk as having a central opening 360, 460 located at a central location on the valve disk. The central opening 360, 460 can be of any shape and position to maximize the flow area.

A method of manufacturing a high flow and quick response check valve 130, 230, 330, 430 can include forming a housing 132, 232, 332, 432 to define a plurality of inlet passages 138, 238, 338, 438, an outlet passage 140, 240, 340, 440 and a cavity 142, 242, 342, 442 located between the plurality of inlet passages 138, 238, 338, 438 and the outlet passage 140, 240, 340, 440. The housing 132, 232, 332, 432 can be formed by injection molding. The method can further include stamping the plurality of inlet passages 138, 238, 338, 438 into a sheet of metal material. The method can include processing a sheet of metal material. A plate 152, 252, 352, 452 can be formed by molding a plurality of valve seats 148, 248, 348, 448 over the corresponding plurality of inlet passages 138, 238, 338, 438 processed in the sheet of metal material. The plurality of valve seats 148, 248, 348, 448 can be positioned within the cavity 142, 242, 342, 442 by assembling a housing 132, 232, 332, 432 to the plate 152, 252, 352, 452. At least one valve disk 144, 244, 344, 444 can be positioned within the cavity 142, 242, 342, 442 defined therebetween. The at least one valve disk 144, 244, 344, 444 can be received within the cavity 142, 242, 342, 442 for reciprocal movement with respect to at least one of the plurality of valve seats 148, 248, 348, 448 and can be normally biased into sealing engagement against the corresponding at least one of the plurality of valve seats 148, 248, 348, 448. At least one biasing member 150, 250, 350, 450 can be assembled within the cavity 142, 242, 342, 442 interposed between the at least one valve disk 144, 244, 344, 444 and housing 132, 232, 332, 432. As best seen in FIGS. 1-4, the at least one biasing member 150, 250, 350, 450 can be formed as a coil spring and received within the cavity 142, 242, 342, 442 for normally biasing at least one valve disk 144, 244, 344, 444 toward at least one of the plurality of valve seats 148, 248, 348, 448 to a seated sealed position and allowing for the movement of the valve disk 144, 244, 344, 444 from the seated sealed position to an unseated or open position spaced from at least one of the plurality of valve seats 148, 248, 348, 448 allowing fluid flow therethrough.

As best seen in FIGS. 5A-5C and 7, the method can further include forming a connecting member 154, 254. The connecting member 154, 254 can be injection molded or stamped from a sheet of metal material or a combination thereof. The plurality of valve disks 144, 244 can be fixedly connected to the connecting member 154, 254. The plurality of valve disks 144, 244 and the connecting member 154, 254 can be formed as a single unitary body. The cavity 142, 242 can receive the connecting member 154, 254 and the plurality of valve disks 144, 244. The at least one biasing member 150, 250 can be formed as a plurality of spring levers 156, 256. By way of example and not limitation, the plurality of spring levers 156, 256 can be formed of a stamped sheet metal, or any other suitable material. The connecting member 154, 254, the plurality of spring levers 156, 256, and the plurality of valve disks 144, 244 can be inserted in the cavity 142, 242. The at least one biasing member 156, 256 can be formed as a stamped sheet metal leaf spring and received within the cavity 142, 242, 342, 442 for normally biasing at least one valve disk 144, 244, 344, 444 toward at least one of the plurality of valve seats 148, 248, 348, 448 to a seated sealed position and allowing for the movement of the valve disk 144, 244, 344, 444 from the seated sealed position to an unseated or open position spaced from at least one of the plurality of valve seats 148, 248, 348, 448 allowing fluid flow therethrough. It should be recognized that the plurality of valve disks 144, 244 and the connecting member 154, 254 can be formed as a single unitary body and biased by at least one biasing member formed as at least one coil spring similar to that shown in FIGS. 1-4, if desired.

As best seen in FIG. 8, the method can further include forming a plurality of compartment tabs 158, 258 by molding the housing 132, 232 and inserting one of the plurality of valve disks 144, 244 into the cavity 142, 242 interposed between each adjacent pair of compartment tabs 158, 258. The assembly of individual separate valve disks 144, 244 within the cavity 142, 242 allows for the independent movement of each valve disk 144, 244 within the housing 132, 232. The plurality of compartment tabs 158, 258 can assist in guiding the independent reciprocal movement of the individual separate valve disks 144, 244 with respect to one another and with respect to the corresponding valve seat, while allowing the reciprocal movement of each valve disk to be varied depending on a potentially different spring force selected for each valve disk. Selection of different spring forces can provide a progressive valve disk operation if desired to vary the fluid flow characteristics for a particular application of the check valve 130, 230.

In operation, the high flow and quick response check valve 130, 230, 330, 430 controls the unidirectional flow of hydraulic oil into a high pressure chamber 10a of the hydraulic tensioner 10. The check valve 130, 230, 330, 430 can provide variable flow to improve the performance of the hydraulic tensioner 10. Performance of the hydraulic tensioner 10 can be based on two primary functions of the check valve 130, 230, 330, 430. First, oil must flow through the check valve 130, 230, 330, 430 and into the high pressure chamber 10a of the tensioner 10 as the piston 10b extends to take up chain slack in the power transmission member 12. If the flow restriction of the check valve 130, 230, 330, 430 is too great, the piston 10b will not have enough oil volume to support an extended length. Secondly, as the chain of the power transmission member 12 begins to push the piston 10b back into the hydraulic tensioner 10, the oil wants to flow back out of the check valve 130, 230, 330, 430. At this point, at least one valve disk 144, 244, 344, 444 must seal off the plurality of oil inlet passages 138, 238, 338, 438 by moving back to a seated position in reverse sequence against the plurality of valve seats 148, 248, 348, 448 corresponding to the plurality of inlet passages 138, 238, 338, 438.

In operation, the use of a plurality of valve disks 144, 244 can provide a variable flow to overcome the deficiencies of a single ball check valve configuration. Using a plurality of smaller and lighter valve disks 144, 244 can achieve the same or greater flow as one large check valve ball. Additionally, the travel distance of the valve disks 144, 244 can be reduced. Since the mass of each valve disk 144, 244 is greatly reduced, as well as the travel distance, the response time to seal off the plurality of inlet passages 138, 238 can be improved. Accordingly, the invention can provide a cost effective design to contain and control the plurality of valve disks 144, 244 in a small, compact, lightweight configuration check valve 130, 230.

Variable flow can be achieved by providing at least two of the valve disks 144, 244 with at least one different fluid flow characteristic selected from a group of different fluid flow characteristics including a different disk size, a different allowable disk travel distance, and a different disk biasing force. These characteristics can be different on a singular basis or in any permissible combination thereof. By way of example and not limitation, at least one different fluid flow characteristic can include: at least two of the plurality of valve disks 144, 244 having different valve disk sizes or diameters; or at least two of the plurality of valve disks 144, 244 having different allowable valve disk travel distances; or at least two of the plurality of valve disks 144, 244 having different biasing forces applied thereto; or in combination at least two of the plurality of valve disks 144, 244 having different sizes and different allowable travel distances; or in combination at least two of the plurality of valve disks 144, 244 having different sizes and different biasing forces applied thereto; or in combination at least two of the plurality of valve disks 144, 244 having different allowable travel distances and different biasing forces applied thereto; or in combination at least two of the plurality of valve disks 144, 244 having different sizes, different allowable travel distances, and different biasing forces applied thereto. By varying these characteristics or parameters, individually and in any permissible combination, an infinite number of curves having different flow to pressure characteristics can be produced to meet any particular application design requirement.

Figure 15:
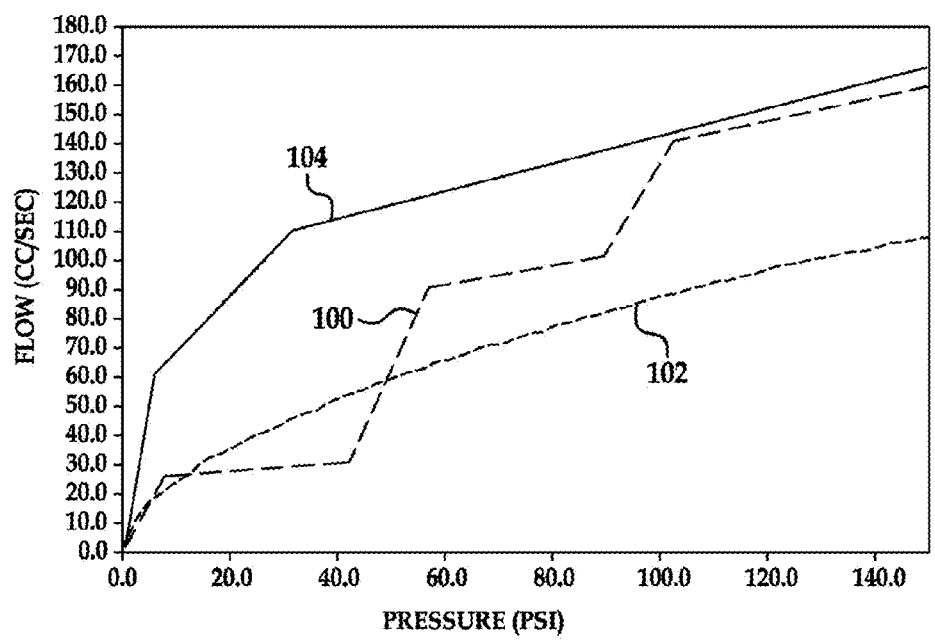
FIG. 15 shows a graph illustrating flow (cc/sec) versus pressure (psi) with a curve corresponding to a single check valve disk, a curve corresponding to a high flow check valve with a plurality of valve disks, and a curve corresponding to a variable flow multiple disk check valve having a plurality of check valve disks operable independently of one another with different spring biasing forces operating against at least some of the individual separate check valve disks allowing for different pop off pressures.

Referring to FIG. 15, by way of example and not limitation, a graph compares flow (cc/sec) versus pressure (psi) for a single ball check valve in curve 102, a high flow/quick response multiple disk check valve (having three disks of uniform disk size, uniform disk travel distance, and uniform biasing force applied thereto) in curve 104, and a variable flow multiple disk check valve (having at least two valve disks 144, 244 of non-uniform size, and/or non-uniform travel distance, and/or non-uniform biasing force applied thereto) in curve 100 according to the invention disclosed. It should be recognized that the flow versus pressure graph curves illustrated can be different from that depicted depending on the number of valve disks 144, 244 selected, the disk size selected for each valve disk 144, 244, the allowable disk travel distance selected for each disk, and the biasing force to be applied selected for each valve disk 144, 244. By way of example and not limitation, as depicted in FIG. 15 in curve 100, each valve disk 144, 244 is tuned to pop-off at a different pressure with unique flow characteristics.

In operation, the use of a single valve disk 344, 444 as a washer to provide variable flow also overcomes the deficiencies of a single ball check valve configuration. The benefit of the washer configuration is increased flow directed through the inner diameter of the housing 332, 432. Accordingly, the configuration can provide a cost effective design to contain and control the single valve disk 344, 444 in a small, compact, lightweight configuration check valve 330, 430.

Figure 16:
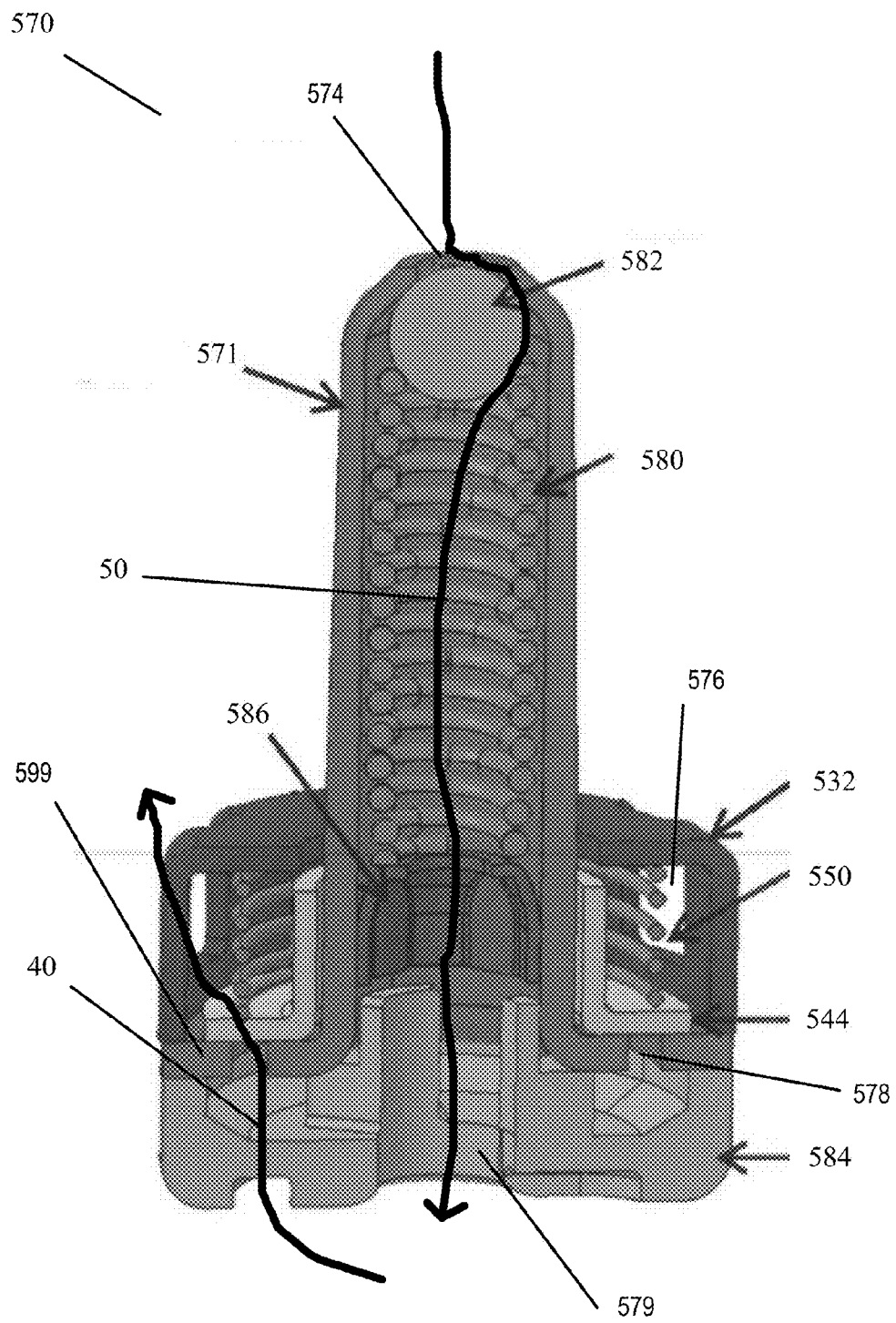
FIG. 16 shows one embodiment of an integrated pressure relief valve with a vent seal.
Figure 17:
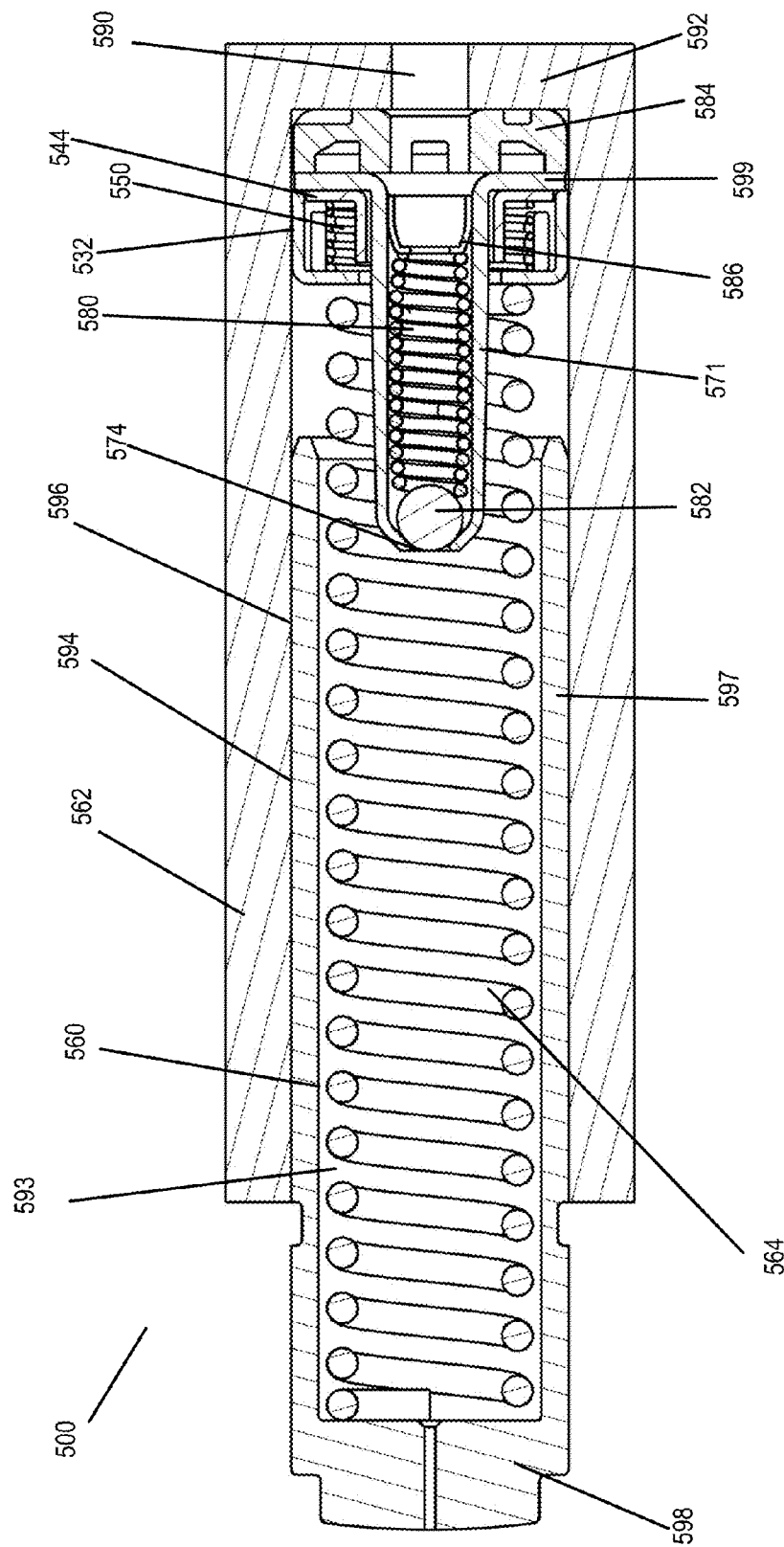
FIG. 17 shows a tensioner including the integrated pressure relief valve of FIG. 16 in a closed position.

FIGS. 16-21 show one embodiment of an integrated pressure relief valve 570 in a tensioner 500. A tensioning arm 20 is not shown in these figures but may be similar to the tensioner arm shown in FIG. 14. As shown in FIG. 17, the tensioner 500 includes a piston 560 and a piston housing 562. The piston housing 562 has a cylindrical bore 594 with an inner circumferential surface 596. The piston housing 562 also has an inlet 590 at an end 592 of the bore 594. The inlet 590 connects to a reservoir or an external supply of pressurized fluid (not shown). The cylindrical piston 560 is slidably assembled within the piston bore 594. The piston 560 includes a hollow cylindrical body 597 with a closed end 598.

A piston biasing member 564, which is preferably a spring, is received within the body of the piston 560. The piston biasing member 564, biases the piston 560 out of the piston housing 562 so that the tip of the piston can contact and push against the tensioner arm 20 as shown for the tensioner 10 in FIG. 14. A hydraulic pressure chamber 593 may be formed between the cylindrical bore 594 of the piston housing 562 and the hollow piston 560 and the piston biasing member 564.

The tensioner 500 also includes an integrated pressure relief valve 570. The integrated pressure relief valve 570 includes pressure relief valve components 571, 580, 582, 586, 599 and disk check valve components 532, 544, 550. The integrated pressure relief valve 570 also includes a vent seal 584. The vent seal 584 is preferably a full ring seal or vent with multiple slots which allow fluid flow into a tortuous path. The disk check valve 544 is placed around the circumference of the pressure relief valve body 571. This minimizes packaging spaces and simplifies the component part, resulting in a low cost design.

The disk check valve 544 is placed around the pressure relief valve body 571. The pressure relief valve body 571 has a length and extends away from a valve spring retainer 532. The disk check valve 544 extends towards the disk check valve spring retainer 532 a length. The bottom extended portion 599 of the pressure relief valve body 571 forms a valve seat for the disk check valve 544 and contains at least one through hole 578. The disk check valve biasing member 550, which is preferably a spring, is located between the disk check valve 544 and the disk check valve spring retainer 532. The pressure relief valve spring 580 contacts the pressure relief valve member 582. While the valve member 582 is shown as a ball valve in the figures, it may have various geometric configurations. For example, the valve member 582 may be a disk or a tapered plug (not shown). The integrated pressure relief valve 570 also includes a pressure relief valve spring retainer 586 located between the pressure relief valve biasing member 580, which is preferably a spring, and the vent seal 584.

Forward flow (e.g. flow towards the pressure chamber) occurs through the disk check valve 544, as shown by arrow 40 in FIG. 16. Fluid flows through the vent seal 584 from the inlet and supply, through through holes 578 in the bottom extended portion 599 and out through holes 576 in the sidewall of the retainer 532. Back flow (e.g. flow away from the pressure chamber) travels through the pressure relief valve, as shown by arrow 50 in FIG. 16. Pressure relief is provided through an aperture 574, moving the valve member 582 when a certain threshold pressure is reached, relieving pressure through the biasing member 580 towards the pressure relief retainer 586 and out a vent 579. It should be noted that additional back flow from the pressure chamber 593 of the tensioner through the disk check valve 544 is prevented by the disk check valve 544.

FIG. 17 shows the tensioner 500 with the integrated check valve closed with no fluid vented or flowing into the hydraulic pressure chamber 593 of the tensioner.

Figure 18:
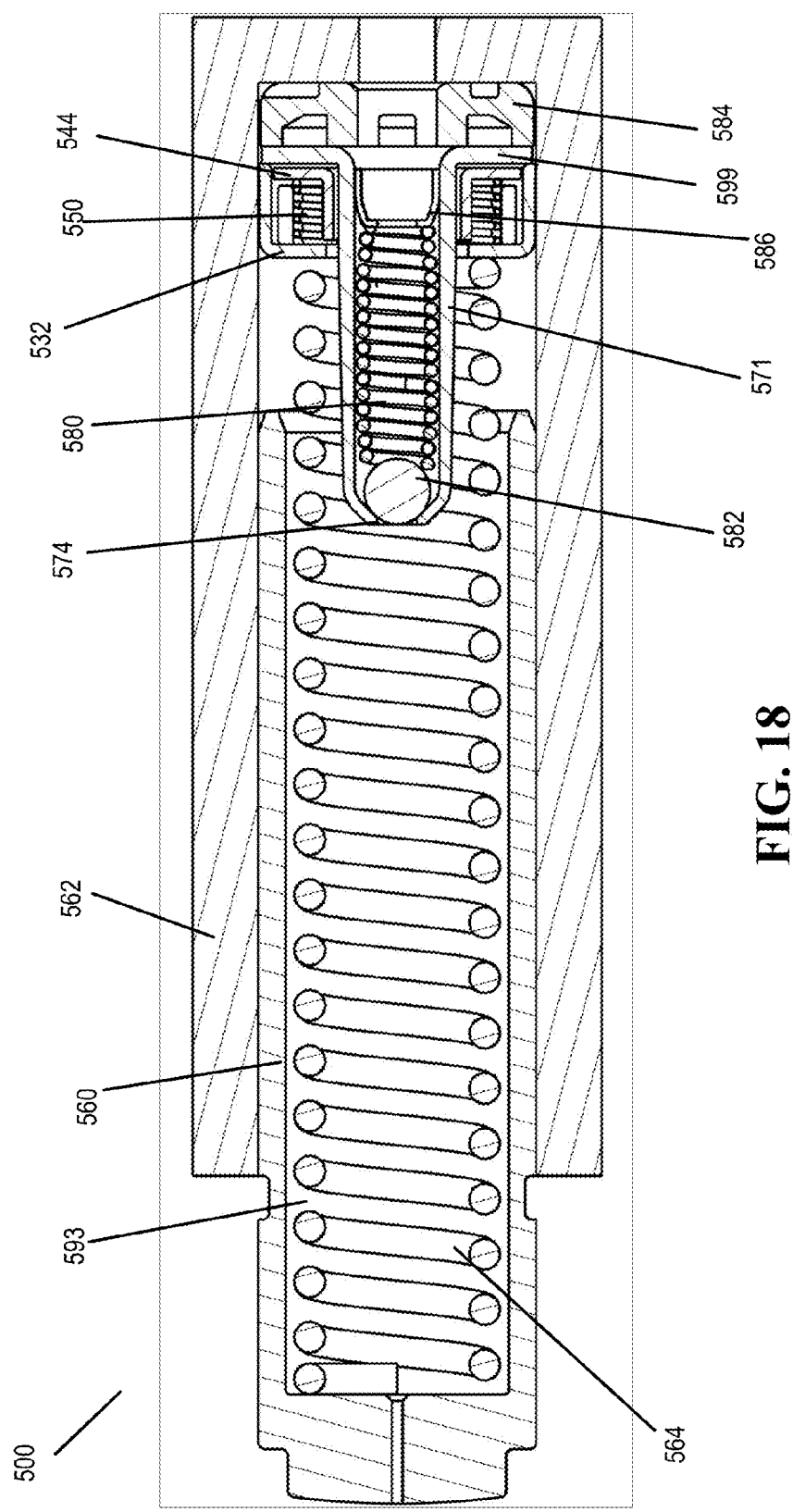
FIG. 18 shows the tensioner of FIG. 17 with the disk check valve half open.

FIG. 18 shows the tensioner 500 with the disk check valve 544 half open, permitting some forward flow from the inlet 590 to the hydraulic pressure chamber 593 through holes 576.

Figure 19:
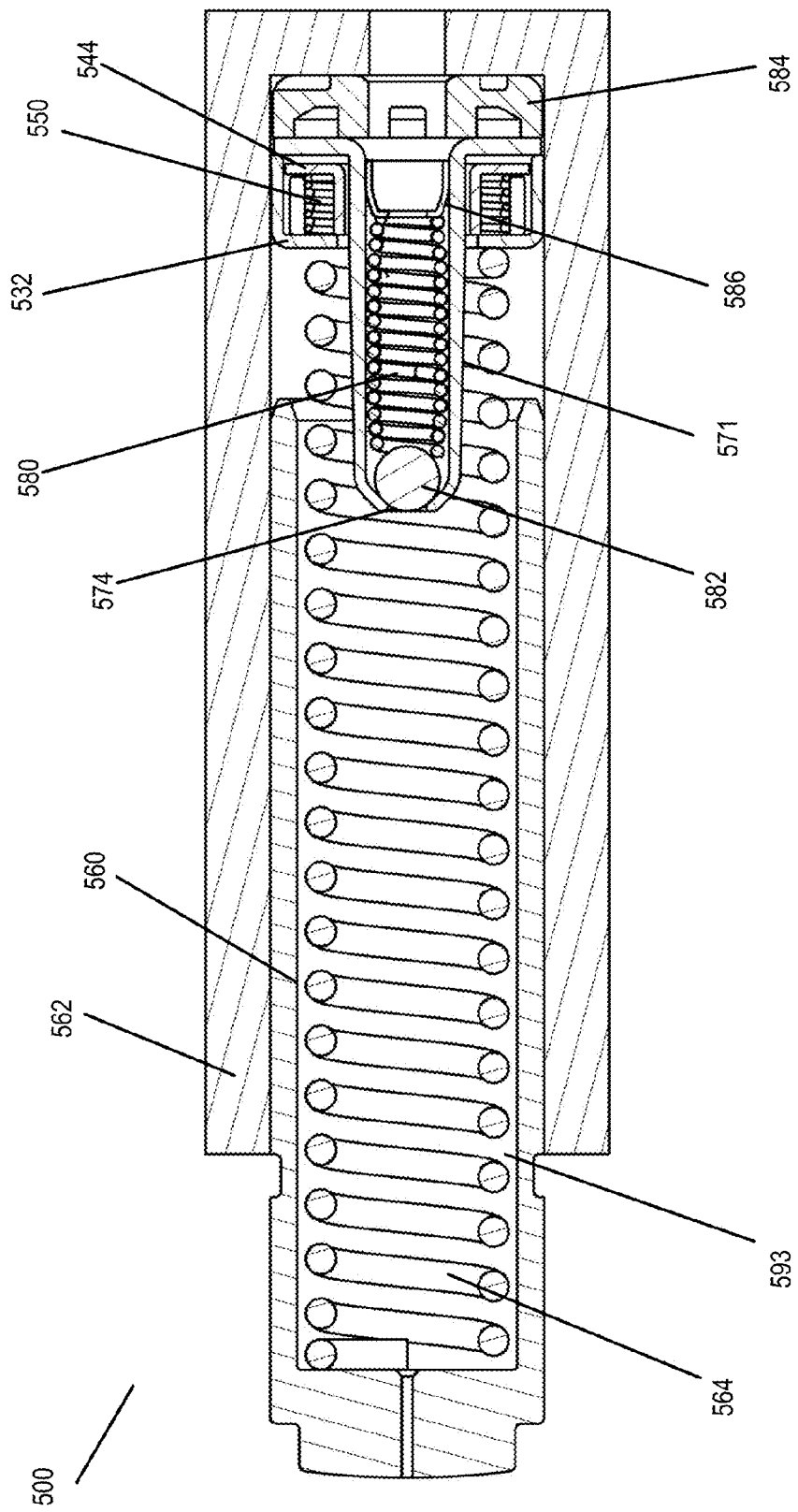
FIG. 19 shows the tensioner of FIG. 17 with the disk check valve fully open.

FIG. 19 shows the tensioner 500 with the disk check valve 544 fully open, permitting maximum forward flow through the check valve to the hydraulic pressure chamber 593 of the tensioner.

Figure 20:
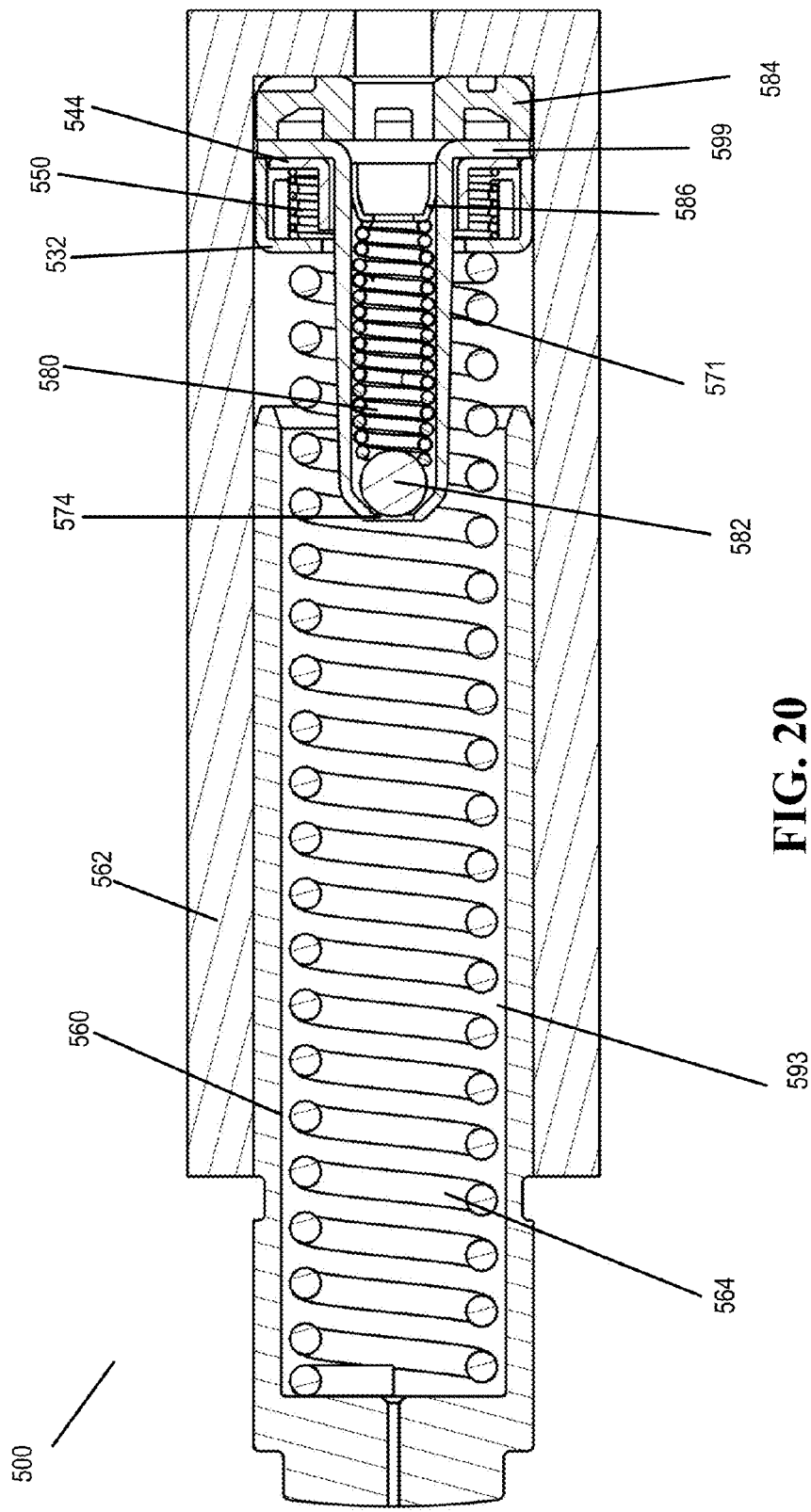
FIG. 20 shows the tensioner of FIG. 17 with the pressure relief valve half open.

FIG. 20 shows the tensioner 500 with the pressure relief valve half open, permitting some back flow.

Figure 21:
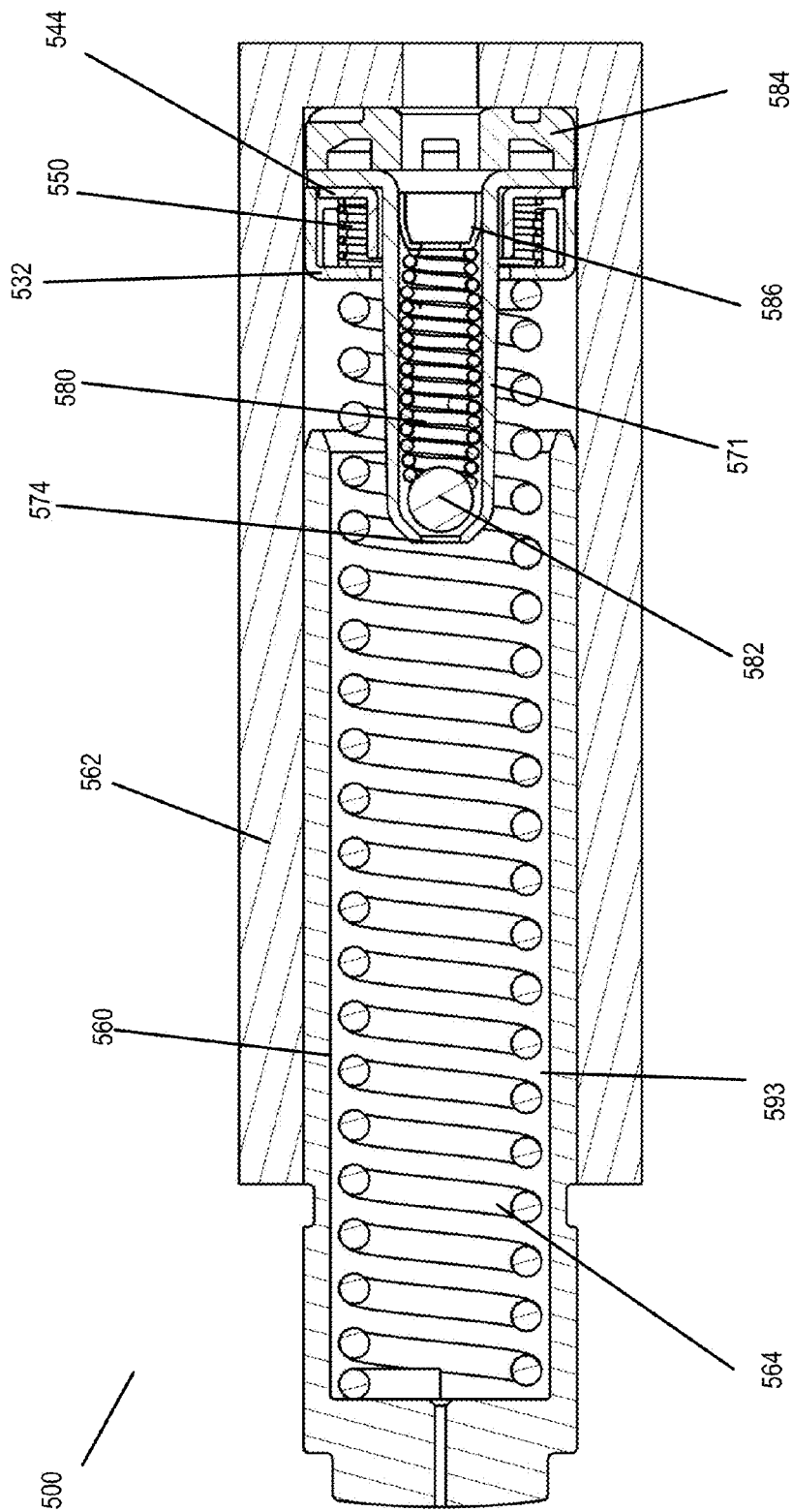
FIG. 21 shows the tensioner of FIG. 17 with the pressure relief valve fully open.

FIG. 21 shows the tensioner 500 with the pressure relief valve fully open, permitting maximum backflow and pressure relief from the hydraulic pressure chamber 593.

The embodiment in FIGS. 16-21 may include any shape valve sealing surface between the pressure relief body extension 599 and the disk check valve 544, including those shown in FIGS. 10-13.

Although a single disk 544 is shown in FIGS. 16-21, more than one disk may be included in the valve shown in this embodiment. For example, a plurality of disk valves 144, 244 as shown in FIGS. 1-2 could be used.

FIGS. 22-27 show another embodiment of an integrated pressure relief valve 670 in a hydraulic tensioner 600. A tensioning arm is not shown in these figures but may be similar to the tensioner arm 20 shown in FIG. 14. The difference between the embodiment of FIGS. 16-21 and FIGS. 22-27 is that the orientation of the disk check valve 644 in FIGS. 22-27 is flipped compared to the orientation of the disk check valve 544 in FIGS. 16-21. The disk check valve 644 rests against the check valve spring retainer body 632 in FIGS. 22-27, while the disk check valve 544 rests against the pressure relief valve body 571 in FIGS. 16-21.

Figure 23:
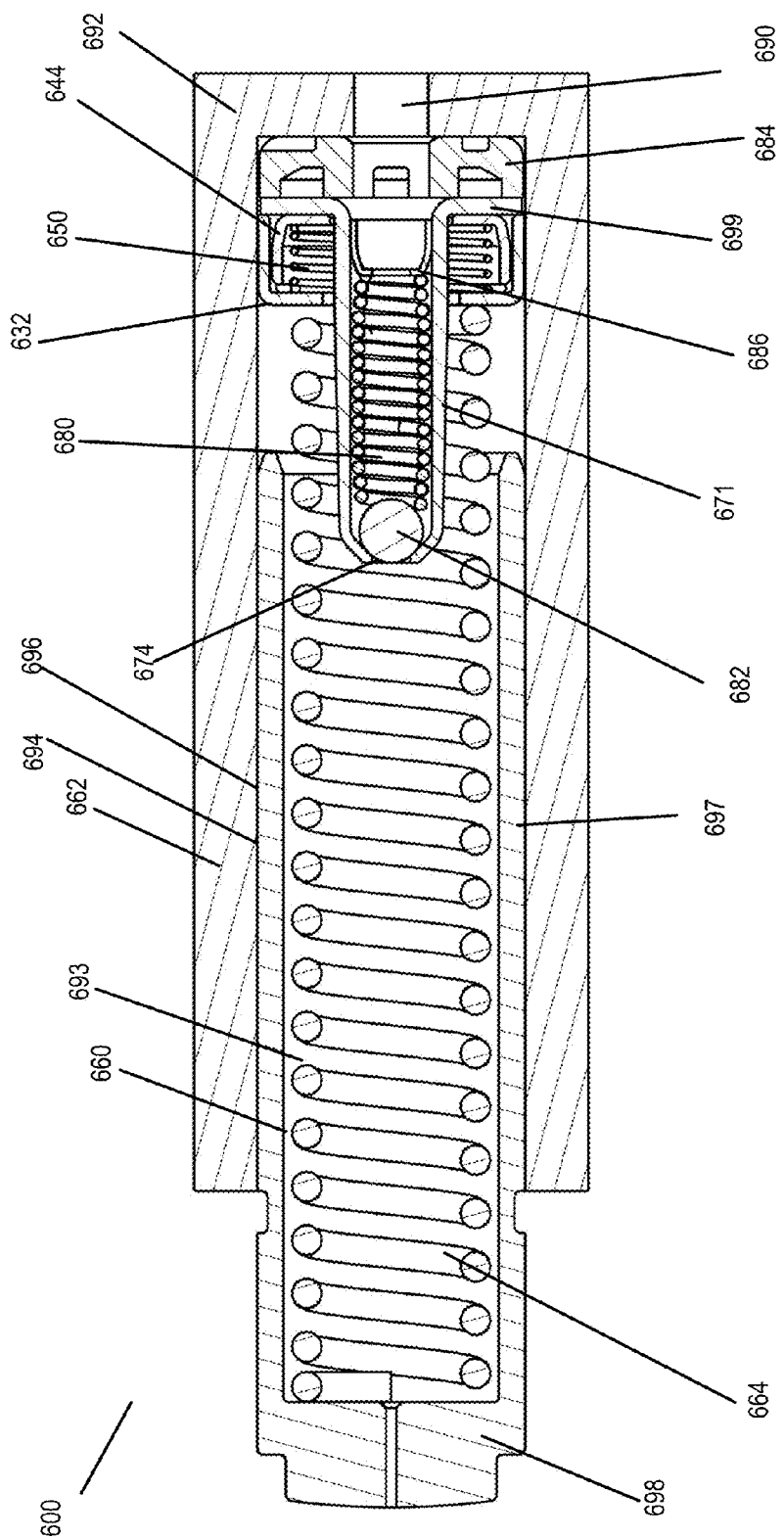
FIG. 23 shows another embodiment of a tensioner including an integrated pressure relief valve in a closed position.

As shown in FIG. 23, the tensioner 600 includes a piston 660 and a piston housing 662. The piston housing 662 has a cylindrical bore 694 with an inner circumferential surface 696. The piston housing 662 also has an inlet 690 at an end 692 of the bore 694. The inlet 690 connects to a reservoir or an external supply of pressurized fluid (not shown). The cylindrical piston 660 is slidably assembled within the piston bore 694. The piston 660 includes a hollow cylindrical body 697 with a closed end 698.

A piston biasing member 664, which is preferably a spring, is received within the body of the piston 660. The piston biasing member 664 biases the piston 660 out of the piston housing 662 so that the tip of the piston can contact and push against the tensioner arm 20 as shown for the tensioner 10 in FIG. 14. A hydraulic pressure chamber 693 may be formed between the cylindrical bore 694 of the piston housing 662 and the hollow piston 660 and the piston biasing member 664.

The tensioner 600 also includes an integrated pressure relief valve 670. The integrated pressure relief valve 670 includes pressure relief valve components 671, 680, 682, 686, 699 and disk check valve components 632, 644, 650. The integrated pressure relief valve 670 also includes a vent seal 684. The vent seal 684 is preferably a full ring seal or vent with multiple slots which allow fluid flow into a tortuous path. The disk check valve 644 is placed around an inner circumference of the disk check valve retainer 632. This minimizes packaging spaces and simplifies the component part, resulting in a low cost design.

The disk check valve 644 is located against the sidewall of the disk check valve spring retainer 632 and extends towards the pressure relief valve body 671 a length. The pressure relief valve body 671 has a length and extends away from a valve spring retainer 632. The bottom extended portion 699 of the pressure relief valve body 671 forms a valve seat for the disk check valve 644 and contains at least one through hole 678. The disk check valve biasing member 650, which is preferably a spring, is located between the disk check valve 644 and the pressure relief valve body 671. The pressure relief valve spring 680 contacts the pressure relief valve member 682. While the valve member 682 is shown as a ball valve in the figures, it may have various geometric configurations. For example, the valve member 682 may be a disk or a tapered plug (not shown). The integrated pressure relief valve 670 also includes a pressure relief valve spring retainer 686 located between the pressure relief valve biasing member 680, which is preferably a spring, and the vent seal 684.

Figure 22:
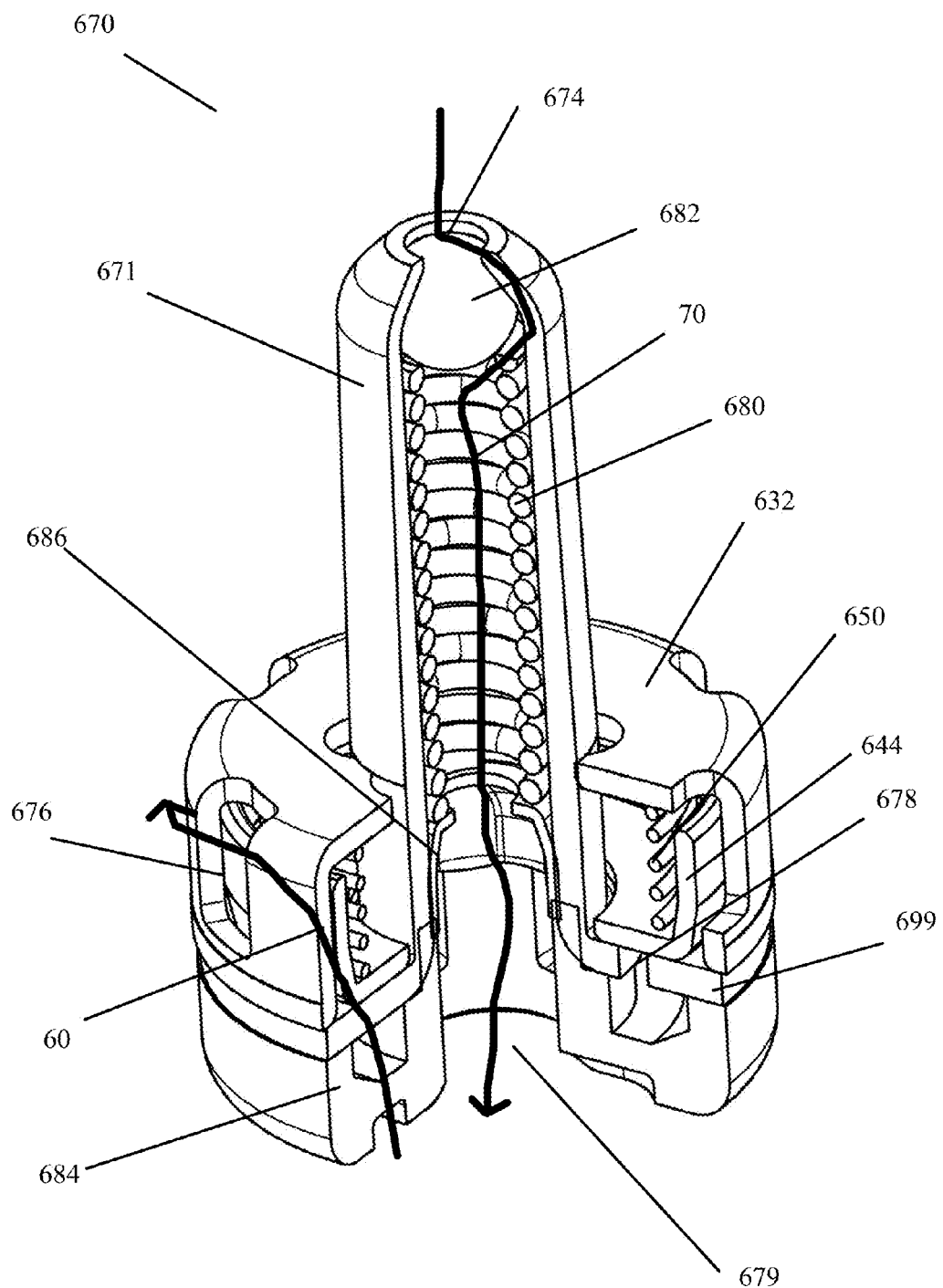
FIG. 22 shows another embodiment of an integrated pressure relief valve with a vent seal.

Forward flow (e.g. flow towards the pressure chamber 693) occurs through the disk check valve 644 as shown by arrow 60 in FIG. 22. Backflow (e.g. flow away from the pressure chamber) travels through the pressure relief valve as shown by arrow 70 in FIG. 22. Fluid flows through the vent seal 684 from the inlet and supply, through through holes 678 in the bottom extended portion 699 and out the through holes 676 in the retainer sidewall 632. Back flow (e.g. flow away from the pressure chamber 693) travels through the pressure relief valve, as shown by arrow 70 in FIG. 22. Pressure relief is provided through an aperture 674, moving the valve member 682 when a certain threshold pressure is reached, relieving pressure through the biasing member 680 towards the pressure relief retainer 686 and out a vent 679. It should be noted that the back flow from the pressure chamber 693 of the tensioner through the disk check valve is prevented by the disk check valve.

FIG. 23 shows a tensioner 600 with the integrated check valve closed with no fluid vent or flowing into the hydraulic pressure chamber 693 of the tensioner.

Figure 24:
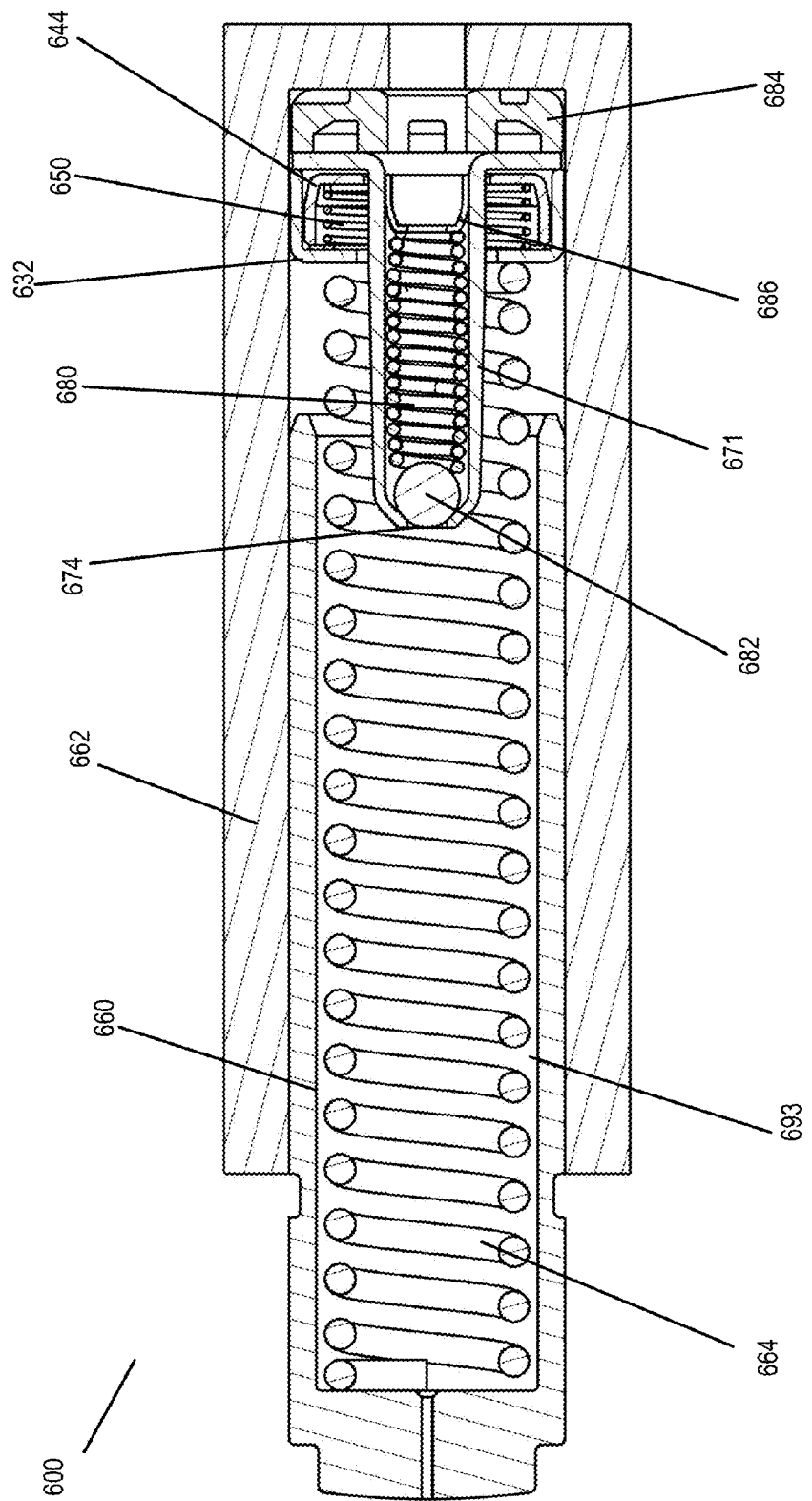
FIG. 24 shows the tensioner of FIG. 23 with the disk check valve half open.

FIG. 24 shows the tensioner 600 with the disk check valve 644 half open, permitting some forward flow from the inlet 690 to the hydraulic pressure chamber 693 through holes 676.

Figure 25:
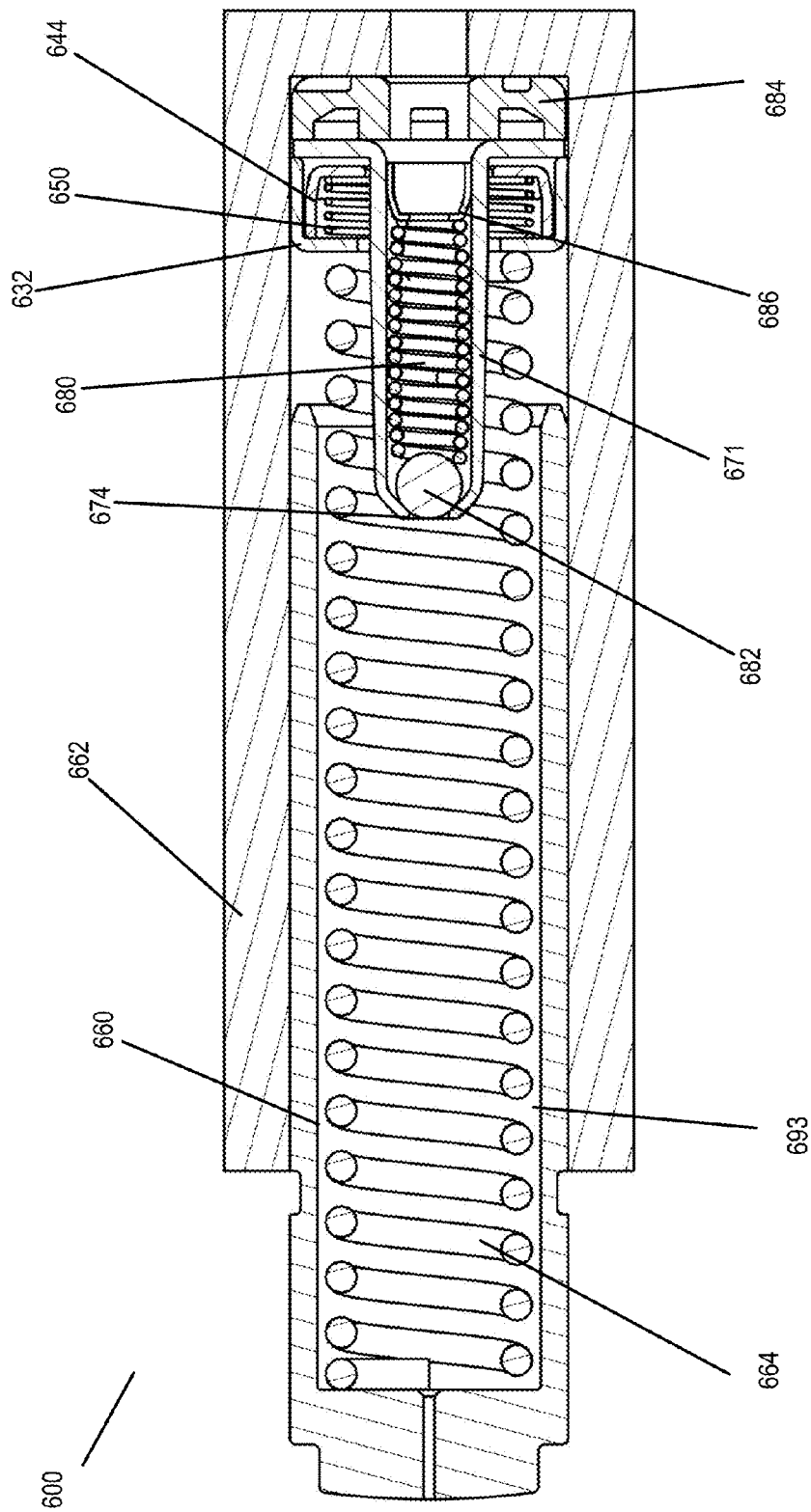
FIG. 25 shows the tensioner of FIG. 23 with the disk check valve fully open.

FIG. 25 shows the tensioner 600 with the disk check valve 644 fully open, permitting maximum forward flow through the check valve to the hydraulic pressure chamber 693 of the tensioner.

Figure 26:
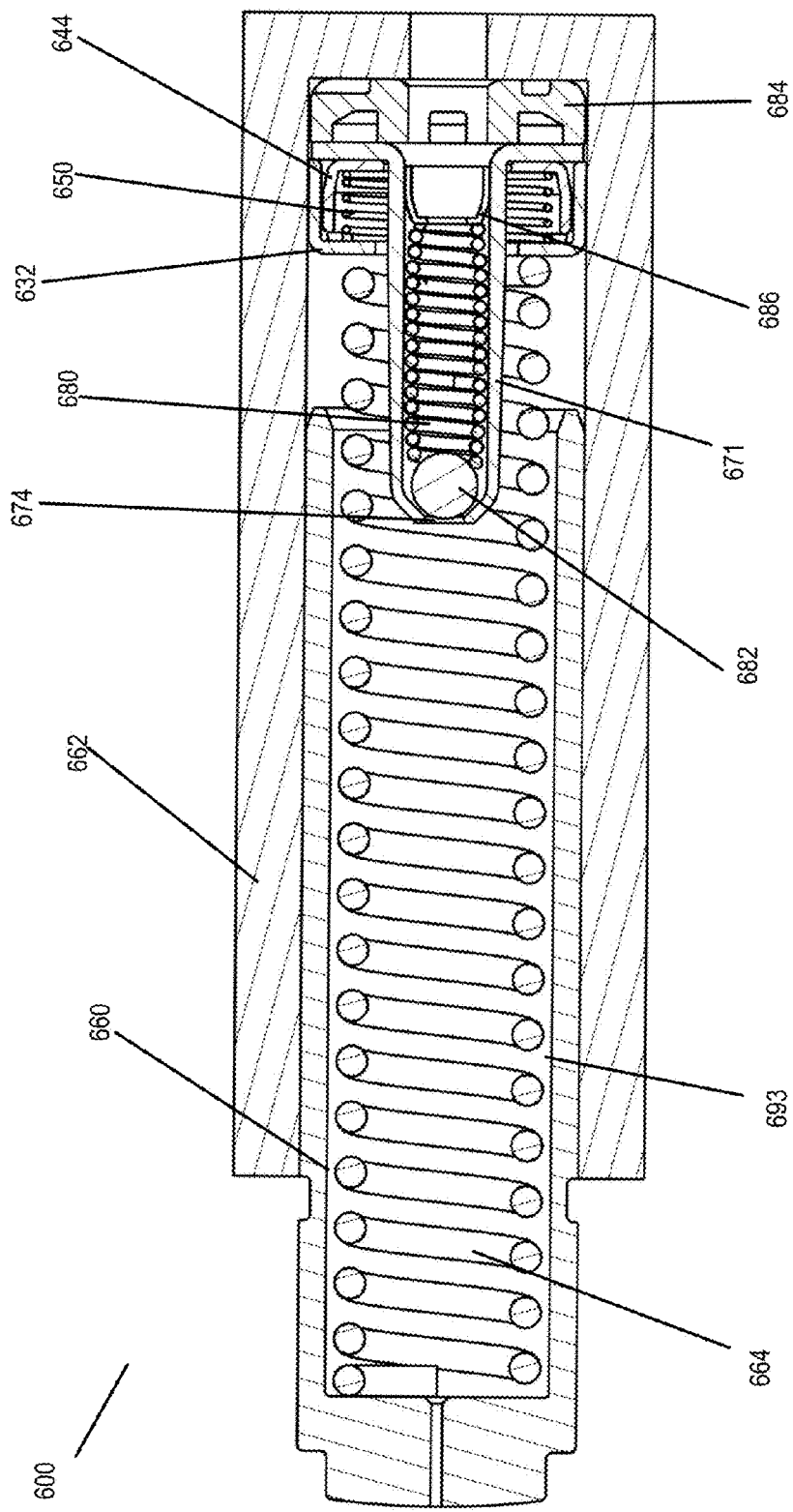
FIG. 26 shows the tensioner of FIG. 23 with the pressure relief valve half open.

FIG. 26 shows the tensioner 600 with the pressure relief valve half open, permitting some back flow.

Figure 27:
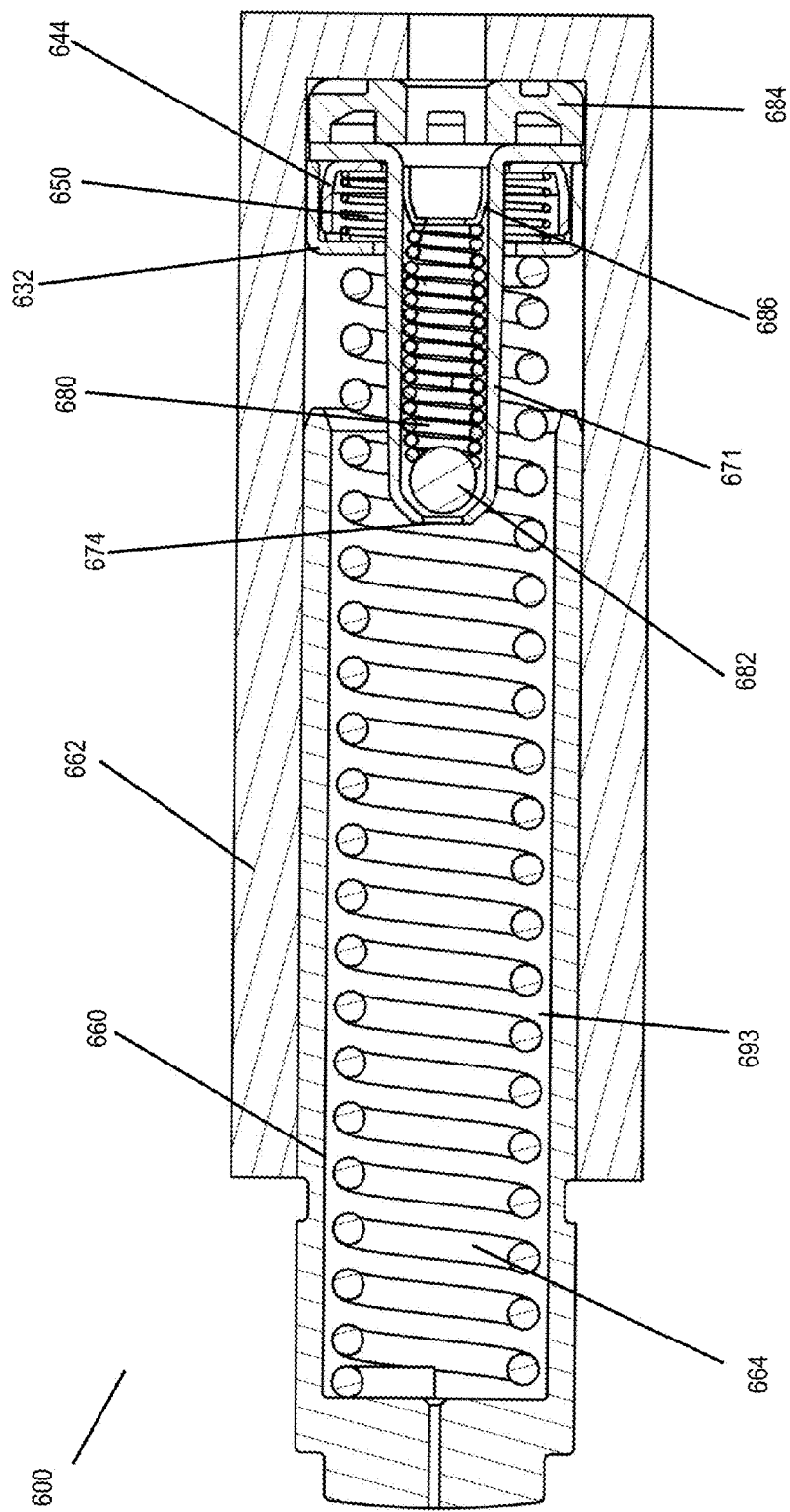
FIG. 27 shows the tensioner of FIG. 23 with the pressure relief valve fully open.
Figure 28:
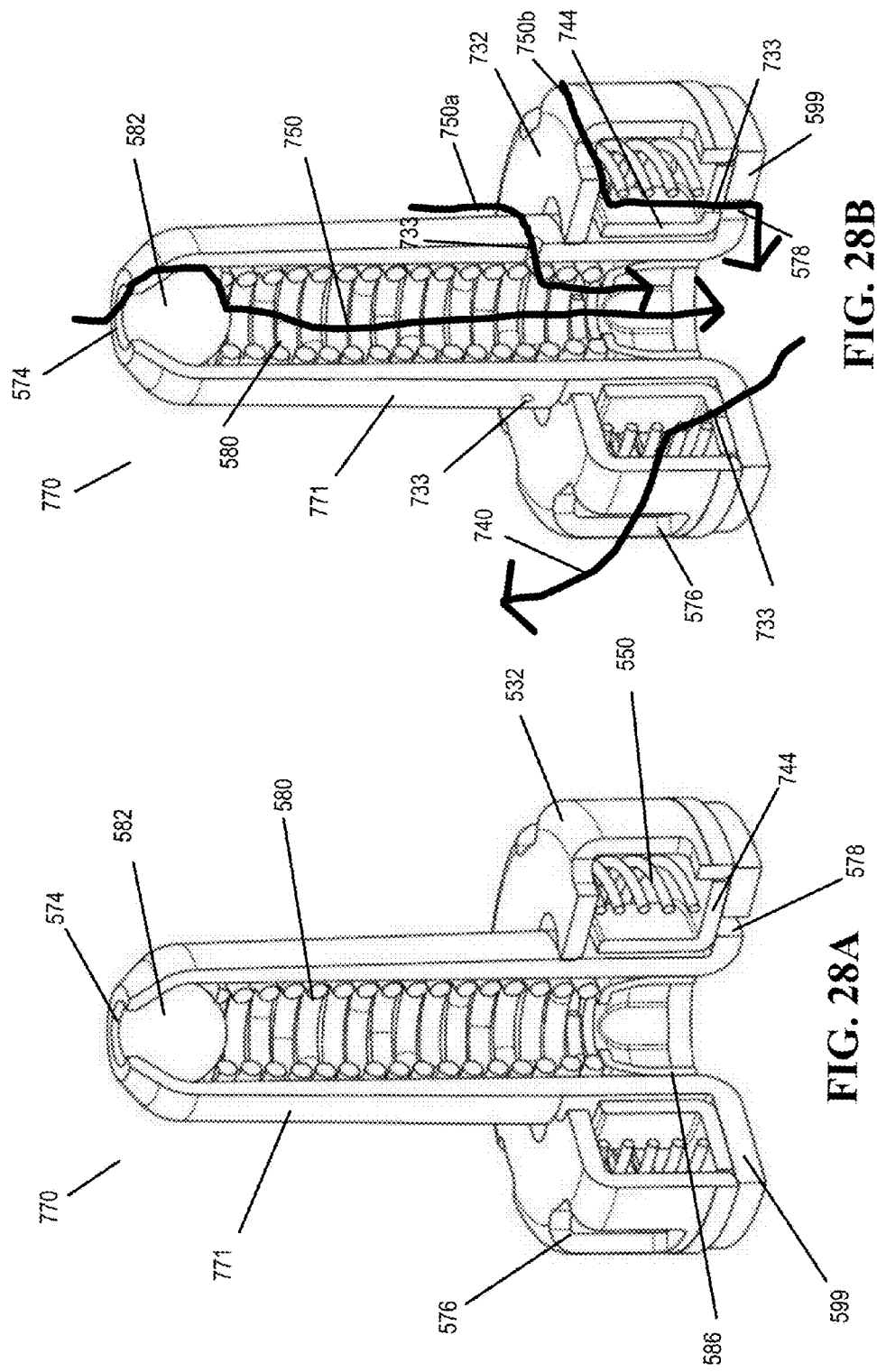
FIG. 28A shows another embodiment of an integrated pressure relief valve with holes to provide pressure relief.
FIG. 28B shows examples of vent holes for pressure relief in the integrated pressure relief valve of FIG. 28A.

FIG. 27 shows the tensioner 600 with the pressure relief valve fully open, permitting maximum backflow and pressure relief from the hydraulic pressure chamber 693.

The disk check valve 644 in this embodiment is similar to a high flow check valve. It is flipped in relation to the spring retainer compared to the embodiment of FIGS. 16-21.

The embodiment in FIGS. 22-27 may include any shape valve sealing surface, including those shown in FIGS. 10-13.

Although a single disk 644 is shown in FIGS. 22-27, more than one disk may be included in the valve shown in this embodiment. For example, a plurality of disk valves 144, 244 as shown in FIGS. 1-2 could be used.

In some preferred embodiments, the vent seal is a full ring vent with multiple holes. The vent seal may optionally have a tortuous path.

FIGS. 28-33 show another embodiment of an integrated pressure relief valve 770 in a tensioner 700. FIGS. 28-33 differ from FIGS. 16-21 in that, instead of the vent seal 584 shown in FIGS. 16-21, one or more small vent holes 733, preferably made by a laser, provide pressure relief. FIG. 28B shows some examples of where the vent holes 733 may be, including vent holes 733 in the pressure relief valve body 771 and vent holes in the disk check valve 744. While holes 733 in both the pressure relief valve body 771 and holes 733 in the disk check valve 744 are shown in this Figure, in preferred embodiments, the holes 733 are in either the disk check valve 744 or the pressure relief valve body 771, and may be located in any location on the disk check valve 744 or pressure relief valve body 771 that permits adequate pressure relief. In other embodiments, one or more holes 733 may be located in the pressure relief valve spring retainer 586 or the disk check valve retainer 532.

Figure 29:
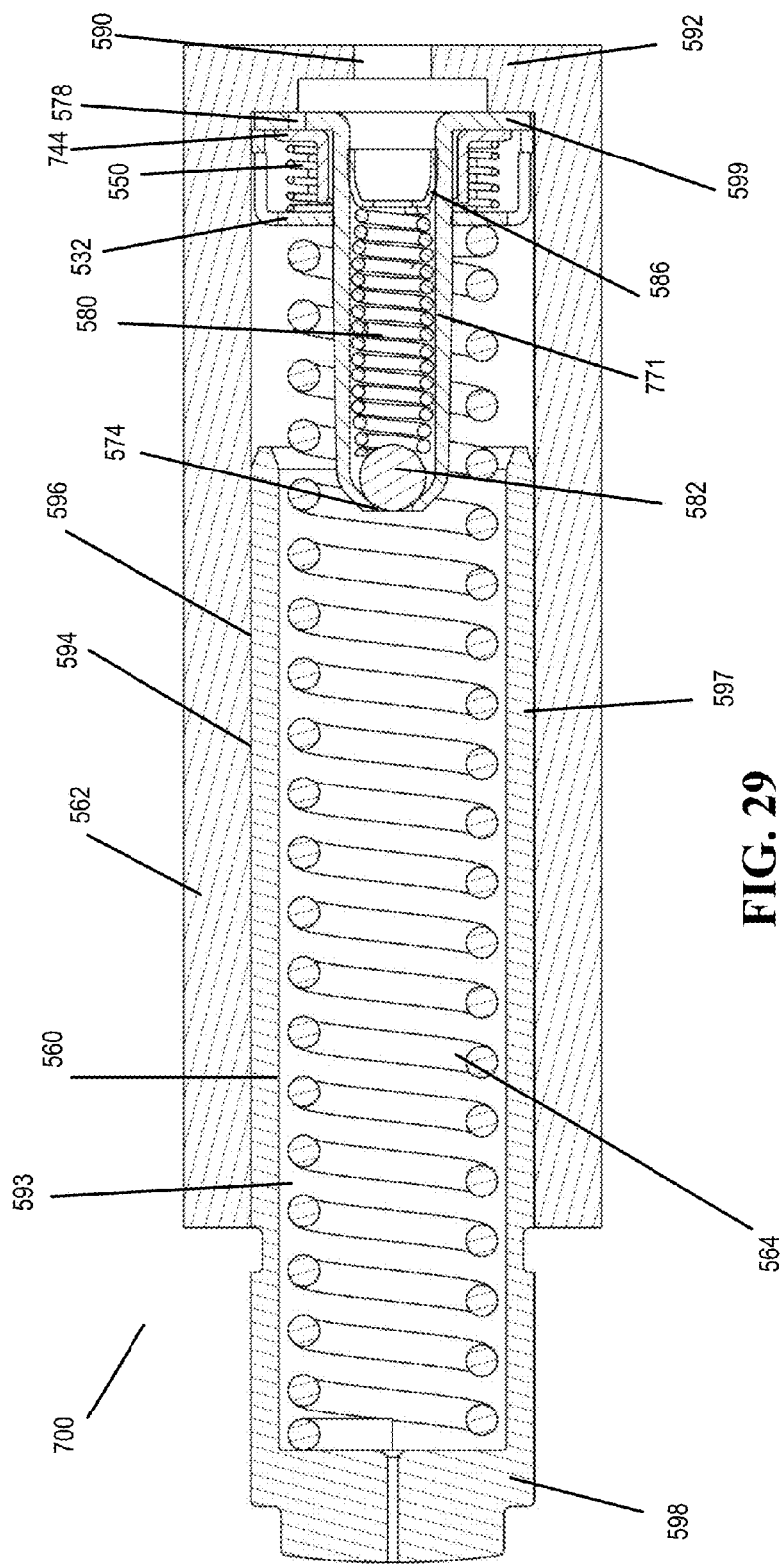
FIG. 29 shows a tensioner including the integrated pressure relief valve of FIG. 28A in a closed position.

A tensioning arm 20 is not shown in these figures but may be similar to the tensioner arm shown in FIG. 14. As shown in FIG. 29, the tensioner 700 includes a piston 560 and a piston housing 562. The piston housing 562 has a cylindrical bore 594 with an inner circumferential surface 596. The piston housing 562 also has an inlet 590 at an end 592 of the bore 594. The inlet 590 connects to a reservoir or an external supply of pressurized fluid (not shown). The cylindrical piston 560 is slidably assembled within the piston bore 594. The piston 560 includes a hollow cylindrical body 597 with a closed end 598.

A piston biasing member 564, which is preferably a spring, is received within the body of the piston 560. The piston biasing member 564, biases the piston 560 out of the piston housing 562 so that the tip of the piston can contact and push against the tensioner arm 20 as shown for the tensioner 10 in FIG. 14. A hydraulic pressure chamber 593 may be formed between the cylindrical bore 594 of the piston housing 562 and the hollow piston 560 and the piston biasing member 564.

The tensioner 700 also includes an integrated pressure relief valve 770. The integrated pressure relief valve 770 includes pressure relief valve components 571, 580, 582, 586, 599 and disk check valve components 532, 744, 550. The integrated pressure relief valve 770 also includes one or more vent holes 733. The design minimizes packaging spaces and simplifies the component part, resulting in a low cost design.

The disk check valve 744 is placed around the pressure relief valve body 771. The pressure relief valve body 771 has a length and extends away from a valve spring retainer 532. The disk check valve 544 extends towards the disk check valve spring retainer 532 a length. The bottom extended portion 599 of the pressure relief valve body 771 forms a valve seat for the disk check valve 744 and contains at least one through hole 578. The disk check valve biasing member 550, which is preferably a spring, is located between the disk check valve 744 and the disk check valve spring retainer 532. The pressure relief valve spring 580 contacts the pressure relief valve member 582. While the valve member 582 is shown as a ball valve in the figures, it may have various geometric configurations. For example, the valve member 582 may be a disk or a tapered plug (not shown). The integrated pressure relief valve 770 also includes a pressure relief valve spring retainer 586.

Forward flow (e.g. flow towards the pressure chamber) occurs through the disk check valve 744, as shown by arrow 740 in FIG. 28B. Fluid flows from the inlet and supply, through through holes 578 in the bottom extended portion 599 and out through holes 576 in the sidewall of the retainer 532. Back flow (e.g. flow away from the pressure chamber) travels through the pressure relief valve. Pressure relief is provided through an aperture 574, moving the valve member 582 when a certain threshold pressure is reached, relieving pressure through the biasing member 580 towards the pressure relief retainer 586, as shown by arrow 750. Additional pressure relief is preferably provided by the one or more vent holes 733, for example when the valve member 582 contacts the aperture 574 (pre pop-off, closing), vent holes 733 permit back flow.

Examples of backflow when the holes 733 are in the pressure relief valve body 771 are shown by arrows 750a and 750b in FIG. 28B. Arrow 750a shows backflow through holes 733 in the pressure relief valve body 771 and arrow 750b shows backflow through holes 733 in the disk check valve 744. When the pressure relief valve is fully open (post pop-off), backflow 750, 750a, 750b occurs both through the aperture 574, the valve member 582, the biasing member 580 and the pressure relief valve spring retainer 586, and through the vent holes 733.

FIG. 29 shows the tensioner 700 with the integrated check valve closed with no fluid vented or flowing into the hydraulic pressure chamber 593 of the tensioner.

Figure 30:
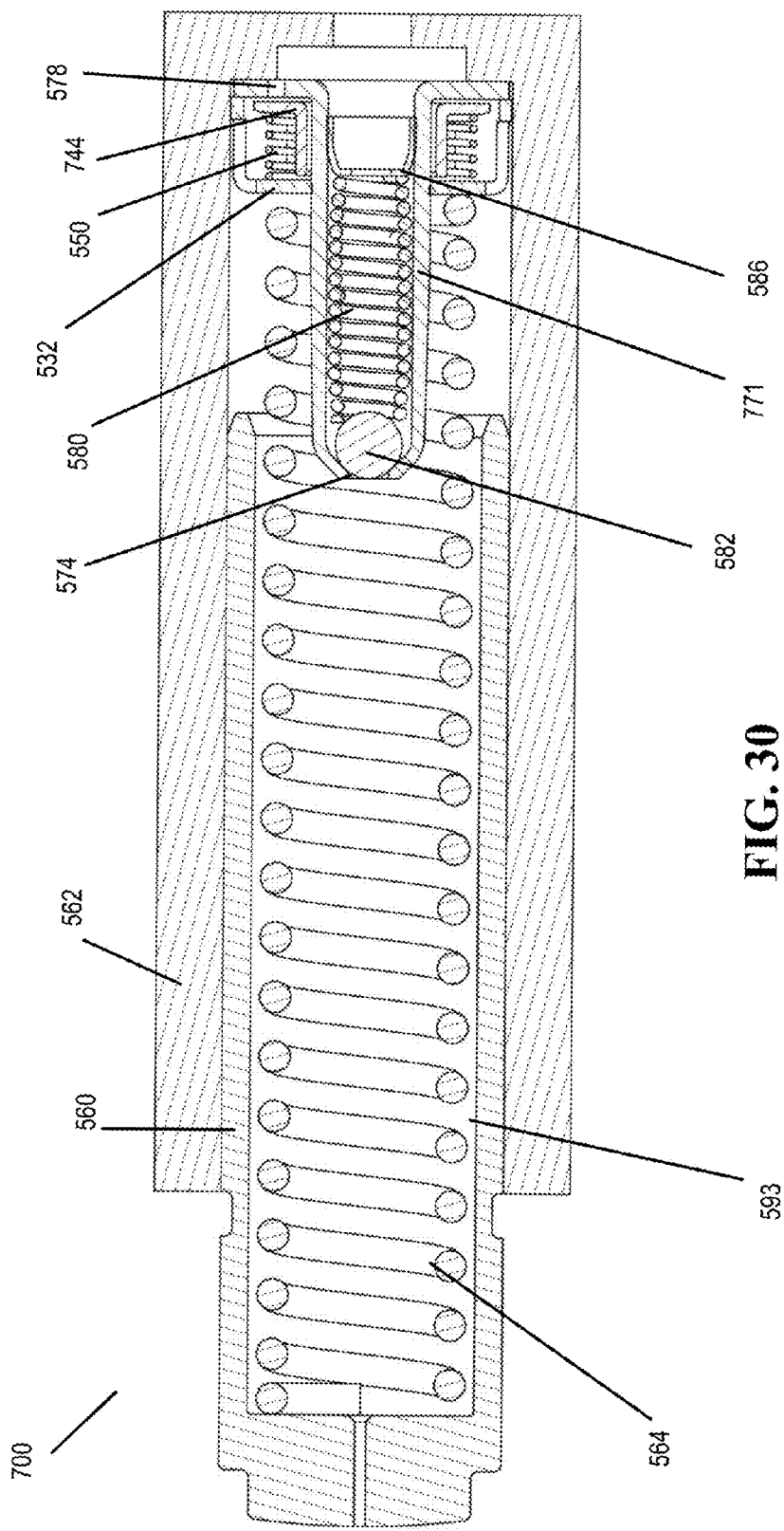
FIG. 30 shows the tensioner of FIG. 29 with the disk check valve half open.

FIG. 30 shows the tensioner 700 with the disk check valve 544 half open, permitting some forward flow from the inlet 590 to the hydraulic pressure chamber 593 through holes 576.

Figure 31:
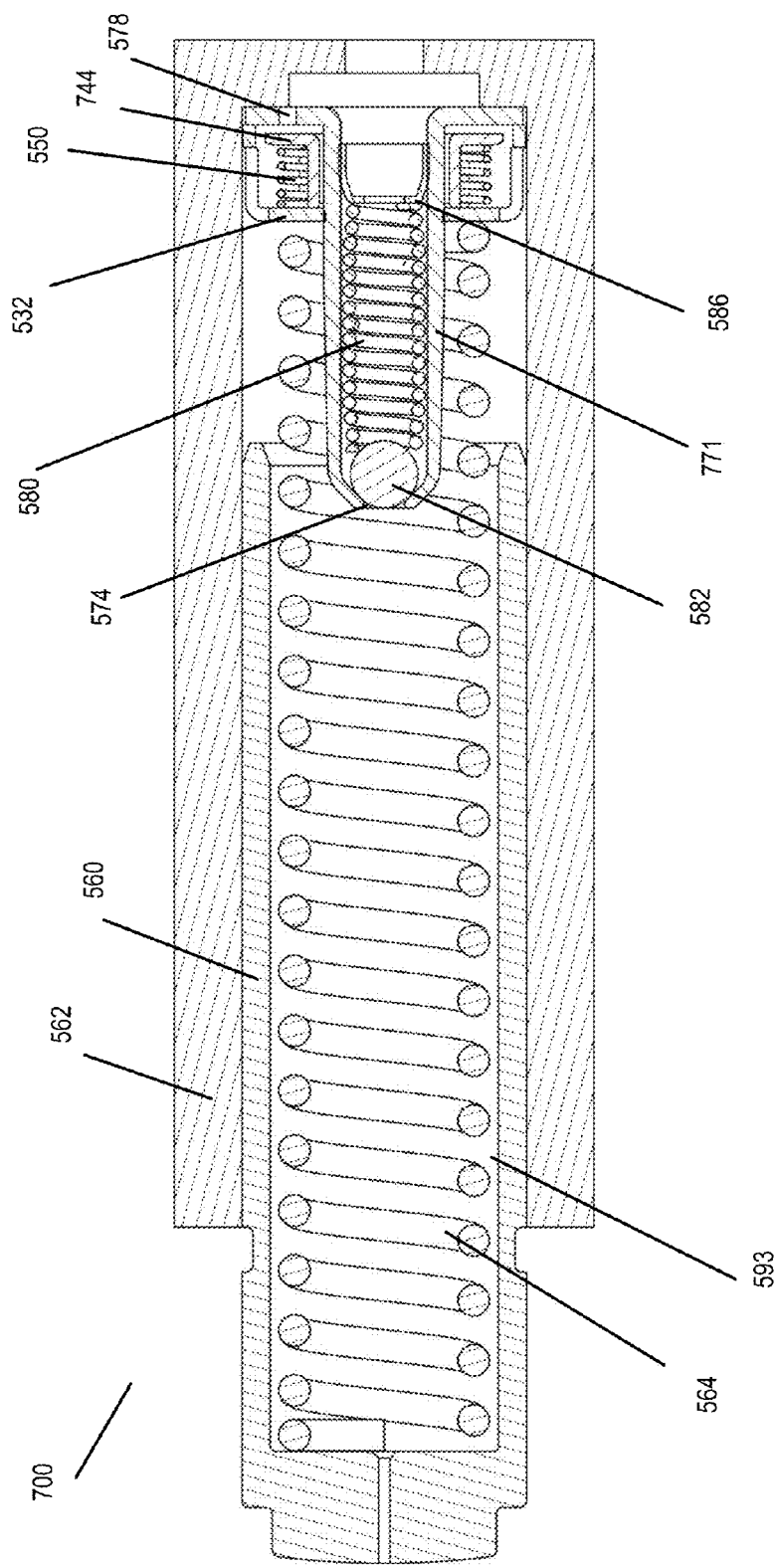
FIG. 31 shows the tensioner of FIG. 29 with the disk check valve fully open.

FIG. 31 shows the tensioner 700 with the disk check valve 544 fully open, permitting maximum forward flow through the check valve to the hydraulic pressure chamber 593 of the tensioner.

Figure 32:
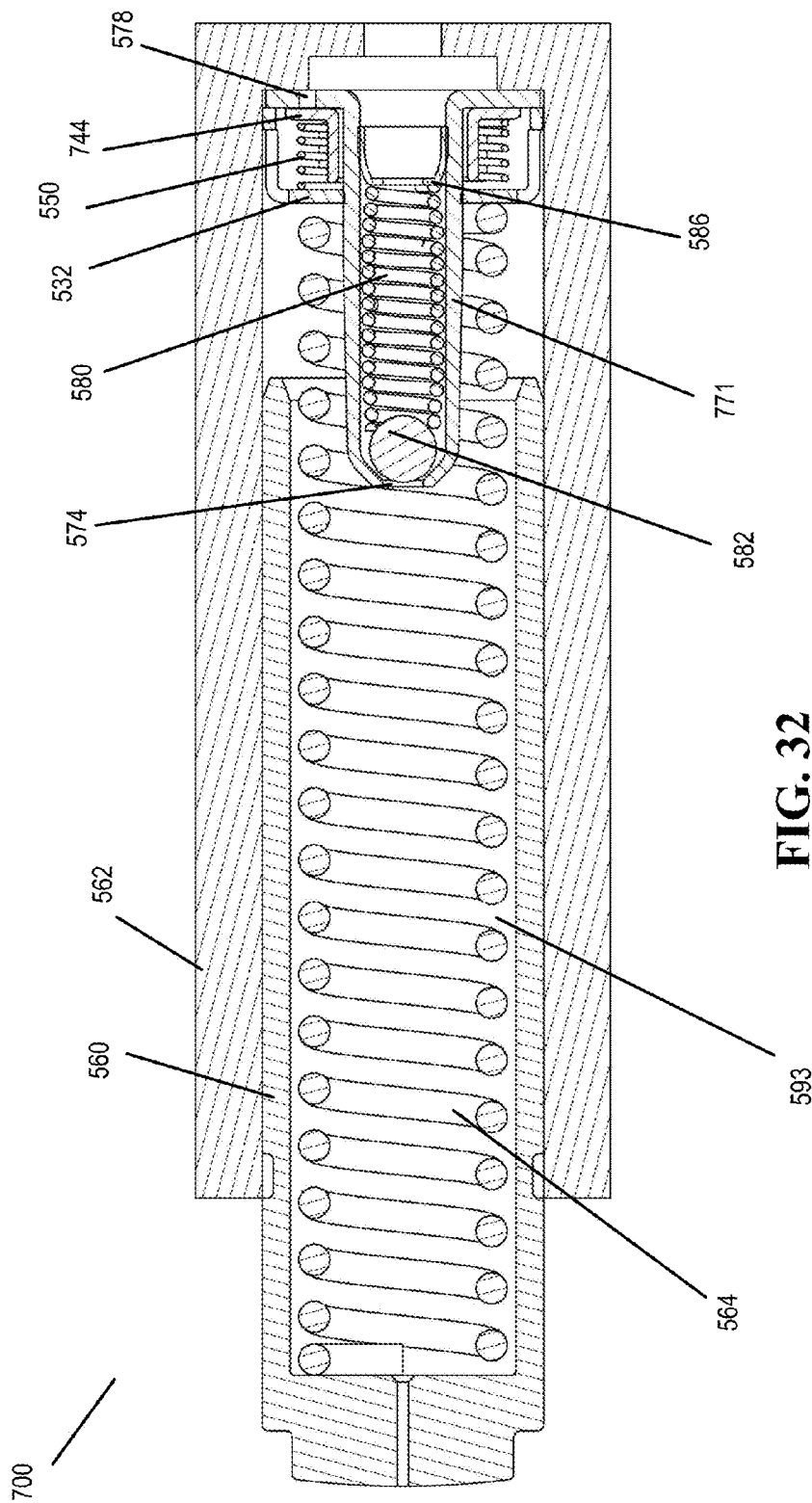
FIG. 32 shows the tensioner of FIG. 29 with the pressure relief valve half open.

FIG. 32 shows the tensioner 700 with the pressure relief valve half open, permitting some back flow.

Figure 33:
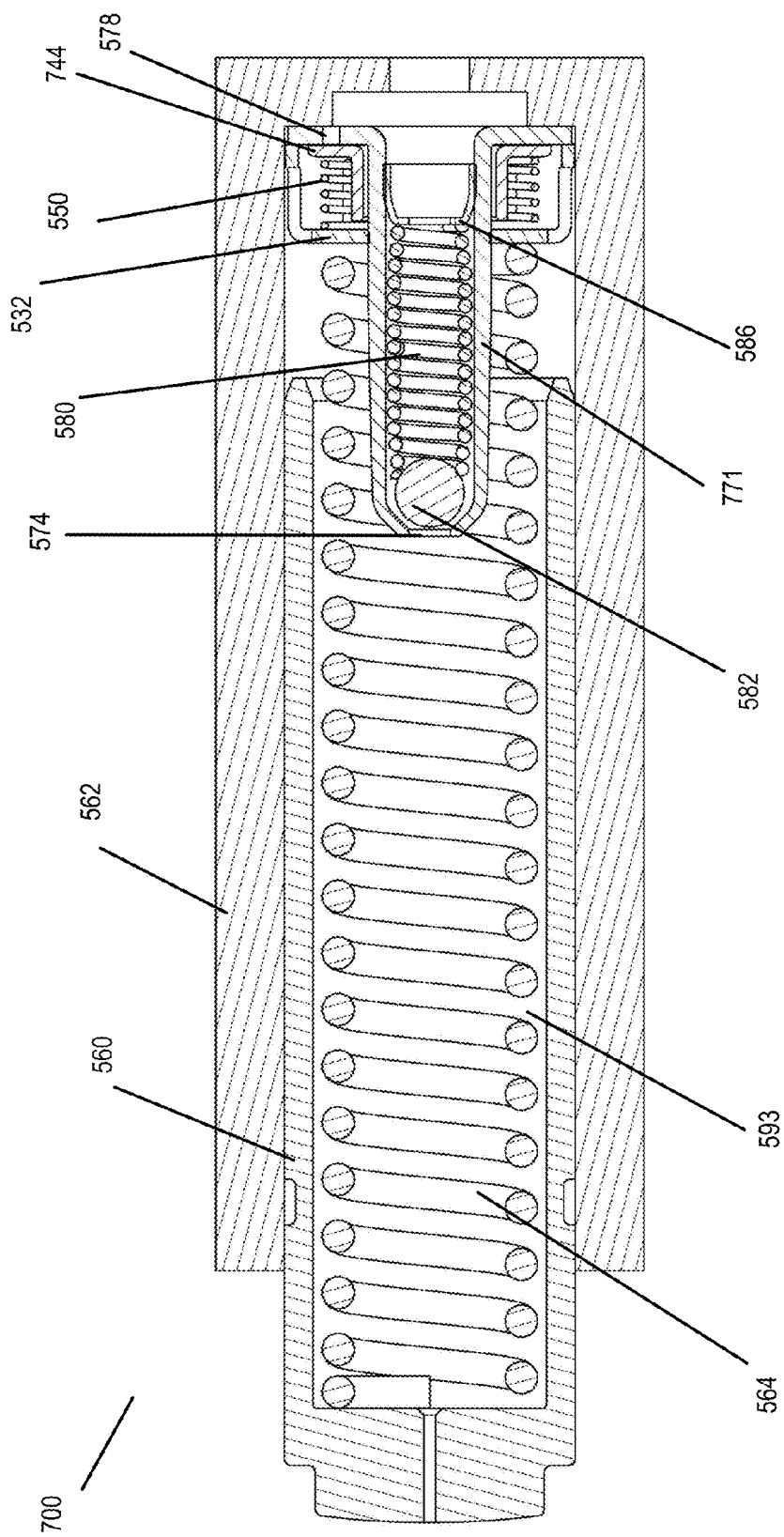
FIG. 33 shows the tensioner of FIG. 29 with the pressure relief valve fully open.
Figure 34:
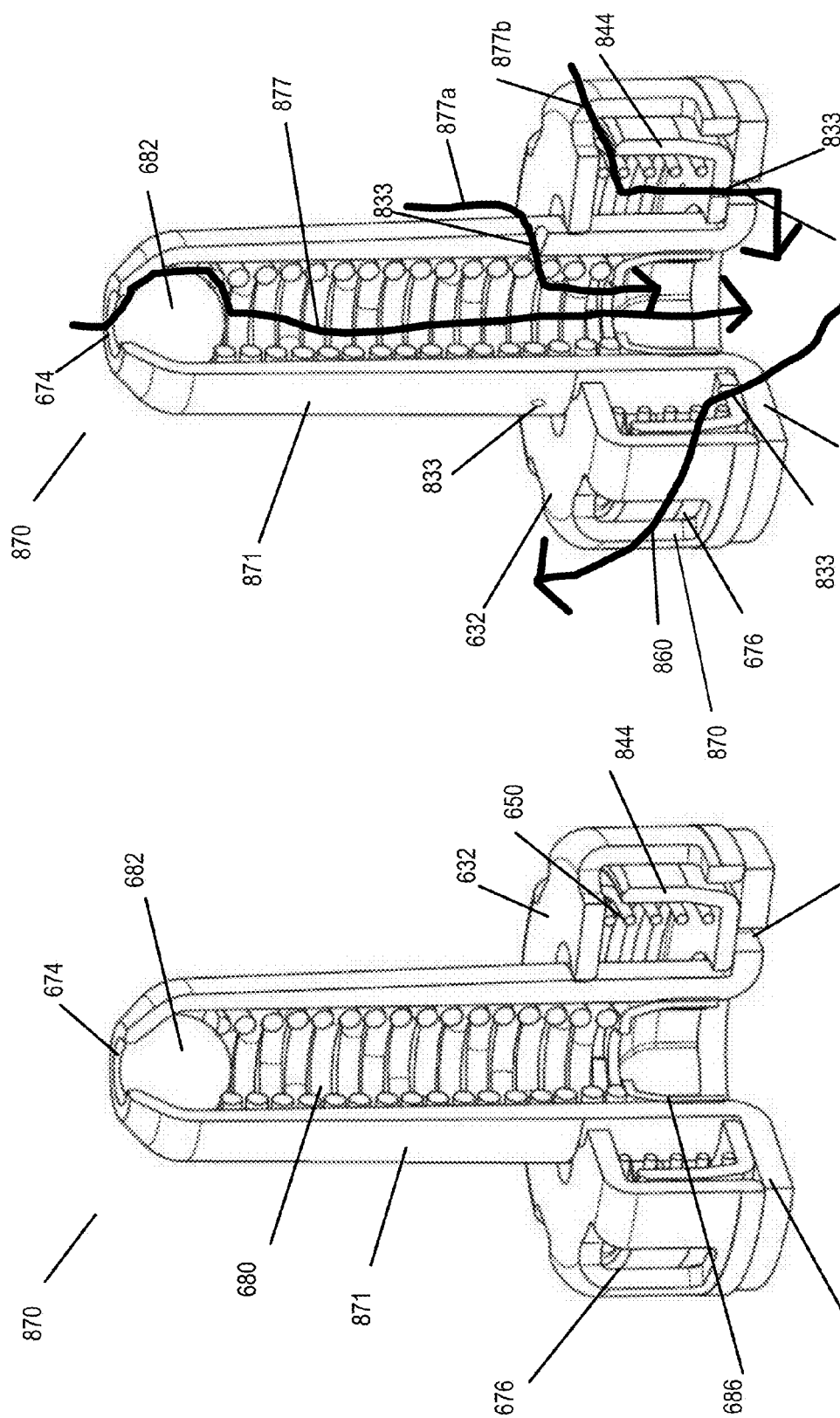
FIG. 34A shows another embodiment of an integrated pressure relief valve with holes to provide pressure relief.
FIG. 34B shows examples of vent holes for pressure relief in the integrated pressure relief valve of FIG. 34A.

FIG. 33 shows the tensioner 700 with the pressure relief valve fully open, permitting maximum backflow and pressure relief from the hydraulic pressure chamber 593.

The embodiment in FIGS. 28-33 may include any shape valve sealing surface between the pressure relief body extension 599 and the disk check valve 544, including those shown in FIGS. 10-13.

Although a single disk 544 is shown in FIGS. 28-33, more than one disk may be included in the valve shown in this embodiment. For example, a plurality of disk valves 144, 244 as shown in FIGS. 1-2 could be used.

FIGS. 34-39 show another embodiment of an integrated pressure relief valve 870 in a hydraulic tensioner 800. FIGS. 34-39 differ from FIGS. 22-27 in that, instead of the vent seal 684 shown in FIGS. 22-27, one or more small vent holes 833, preferably made by a laser, provide pressure relief. FIG. 34B shows some examples of where the vent holes 833 may be, including vent holes 833 in the pressure relief valve body 871 and vent holes in the disk check valve 844. While holes 833 in both the pressure relief valve body 871 and holes 833 in the disk check valve 844 are shown in this Figure, in preferred embodiments, the holes 833 are preferably in either disk check valve 844 or the pressure relief valve body 871, and may be located in any location on the disk check valve 844 or pressure relief valve body 871 that permits adequate pressure relief. In other embodiments, one or more holes 833 may be located in the pressure relief valve spring retainer 686 or the disk check valve retainer 632.

A tensioning arm is not shown in these figures but may be similar to the tensioner arm 20 shown in FIG. 14. The difference between the embodiment of FIGS. 28-33 and FIGS. 34-39 is that the orientation of the disk check valve 844 in FIGS. 34-39 is flipped compared to the orientation of the disk check valve 744 in FIGS. 28-33. The disk check valve 844 rests against the check valve spring retainer body 632 in FIGS. 34-39, while the disk check valve 744 rests against the pressure relief valve body 771 in FIGS. 28-33.

Figure 35:
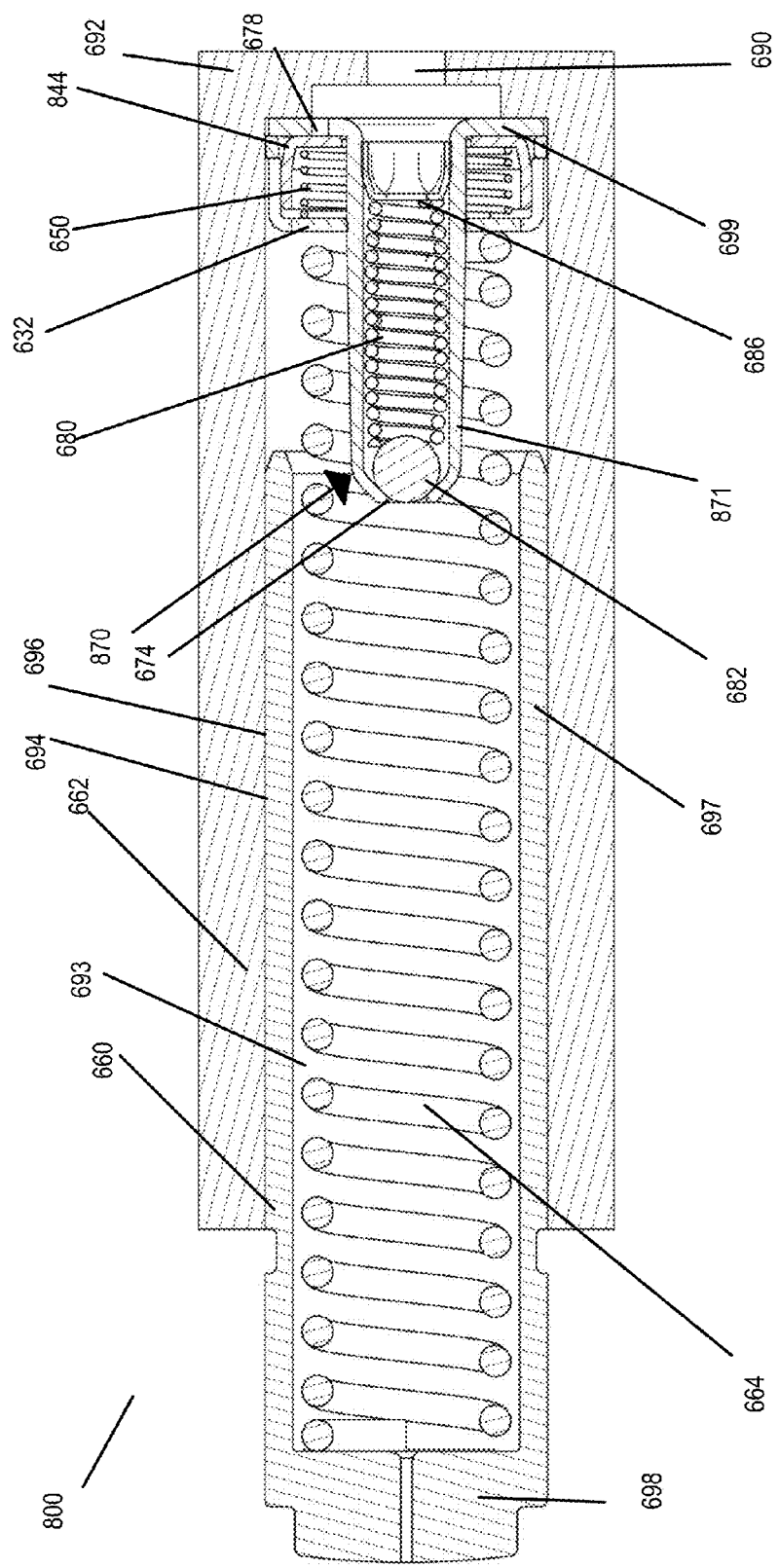
FIG. 35 shows another embodiment of a tensioner of FIG. 34A including an integrated pressure relief valve in a closed position.

As shown in FIG. 35, the tensioner 800 includes a piston 660 and a piston housing 662. The piston housing 662 has a cylindrical bore 694 with an inner circumferential surface 696. The piston housing 662 also has an inlet 690 at an end 692 of the bore 694. The inlet 690 connects to a reservoir or an external supply of pressurized fluid (not shown). The cylindrical piston 660 is slidably assembled within the piston bore 694. The piston 660 includes a hollow cylindrical body 697 with a closed end 698.

A piston biasing member 664, which is preferably a spring, is received within the body of the piston 660. The piston biasing member 664 biases the piston 660 out of the piston housing 662 so that the tip of the piston can contact and push against the tensioner arm 20 as shown for the tensioner 10 in FIG. 14. A hydraulic pressure chamber 693 may be formed between the cylindrical bore 694 of the piston housing 662 and the hollow piston 660 and the piston biasing member 664.

The tensioner 800 also includes an integrated pressure relief valve 870. The integrated pressure relief valve 870 includes pressure relief valve components 871, 680, 682, 686, 699 and disk check valve components 632, 844, 650. The integrated pressure relief valve 870 also includes one or more vent holes 833. This minimizes packaging spaces and simplifies the component part, resulting in a low cost design.

The disk check valve 844 is located against the sidewall of the disk check valve spring retainer 632 and extends towards the pressure relief valve body 871 a length. The pressure relief valve body 871 has a length and extends away from a valve spring retainer 632. The bottom extended portion 699 of the pressure relief valve body 871 forms a valve seat for the disk check valve 844 and contains at least one through hole 678. The disk check valve biasing member 650, which is preferably a spring, is located between the disk check valve 844 and the pressure relief valve body 871. The pressure relief valve spring 680 contacts the pressure relief valve member 682. While the valve member 682 is shown as a ball valve in the figures, it may have various geometric configurations. For example, the valve member 682 may be a disk or a tapered plug (not shown). The integrated pressure relief valve 870 also includes a pressure relief valve spring retainer 686.

Forward flow (e.g. flow towards the pressure chamber 693) occurs through the disk check valve 844 as shown by arrow 860 in FIG. 34B. Fluid flows from the inlet and supply, through through holes 678 in the bottom extended portion 699 and out the through holes 676 in the retainer sidewall 632. Back flow (e.g. flow away from the pressure chamber 693) travels through the pressure relief valve. Pressure relief is provided through an aperture 674, moving the valve member 682 when a certain threshold pressure is reached, relieving pressure through the biasing member 680 towards the pressure relief retainer 686, as shown by arrow 877. Additional pressure relief is preferably provided by the one or more vent holes 833, for example when the valve member 682 contacts the aperture 674 (pre pop-off, closing), vent holes 833 permit back flow.

Examples of backflow when the holes 833 are in the pressure relief valve body 871 are shown by arrows 877a and 877b in FIG. 34B. Arrow 877a shows backflow through holes 833 in the pressure relief valve body 871 and arrow 877b shows backflow through holes 833 in the disk check valve 844. When the pressure relief valve is fully open (post pop-off), backflow 877, 877a, 877b occurs both through the aperture 674, the valve member 682, the biasing member 680 and the pressure relief valve spring retainer 686, and through the vent holes 833.

FIG. 35 shows a tensioner 800 with the integrated check valve closed with no fluid vent or flowing into the hydraulic pressure chamber 693 of the tensioner.

Figure 36:
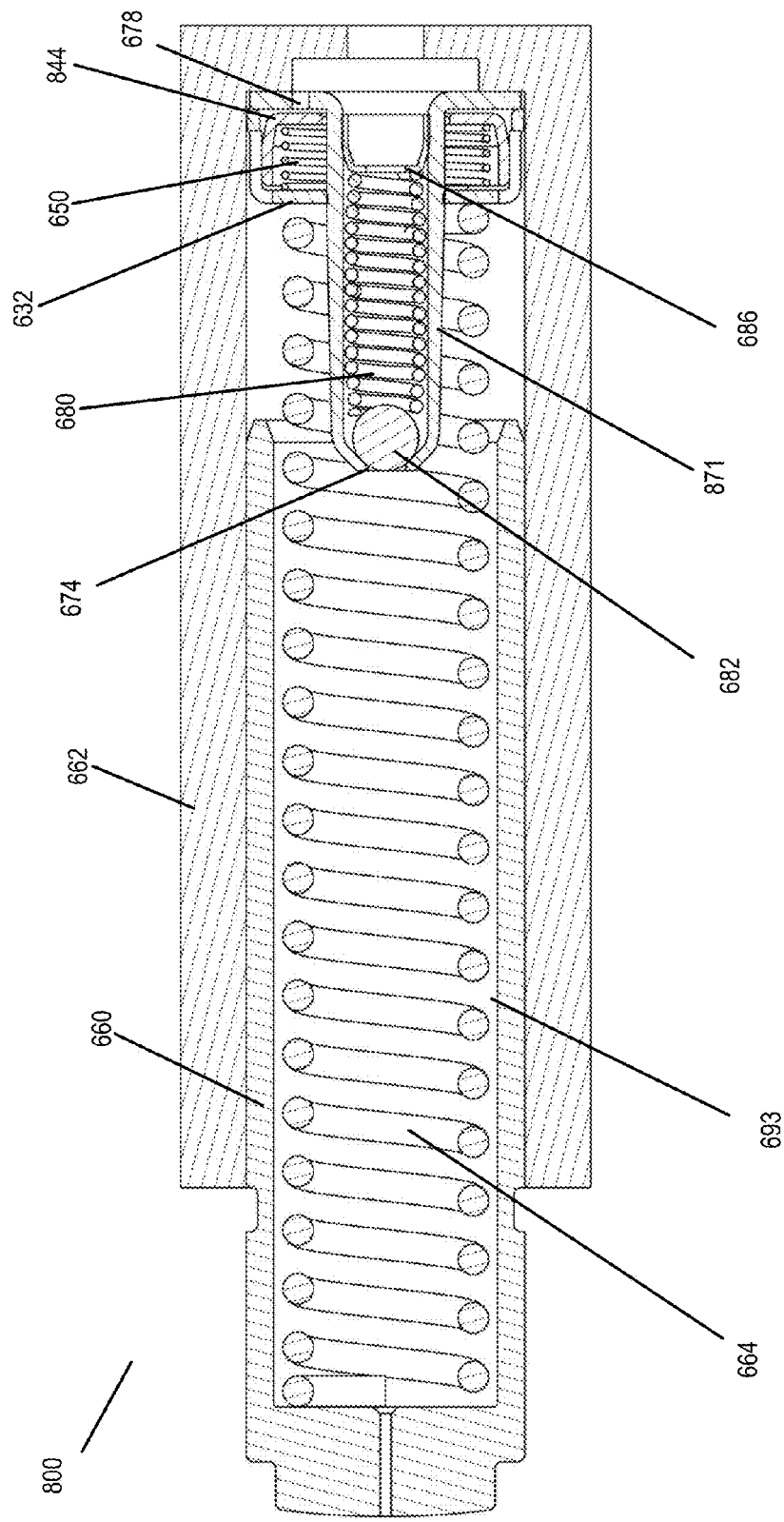
FIG. 36 shows the tensioner of FIG. 35 with the disk check valve half open.

FIG. 36 shows the tensioner 800 with the disk check valve 844 half open, permitting some forward flow from the inlet 690 to the hydraulic pressure chamber 693 through holes 676.

Figure 37:
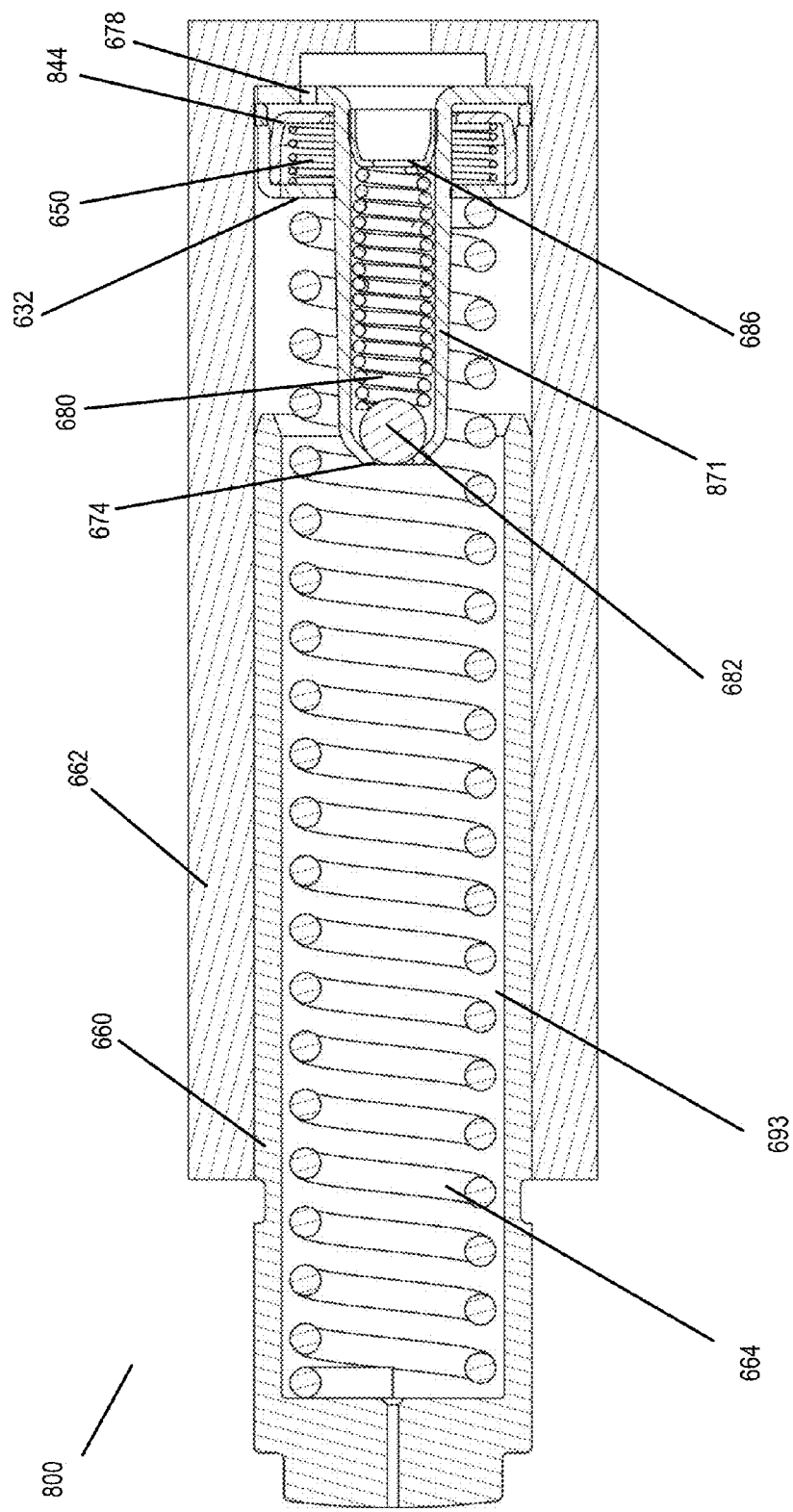
FIG. 37 shows the tensioner of FIG. 35 with the disk check valve fully open.

FIG. 37 shows the tensioner 800 with the disk check valve 844 fully open, permitting maximum forward flow through the check valve to the hydraulic pressure chamber 693 of the tensioner.

Figure 38:
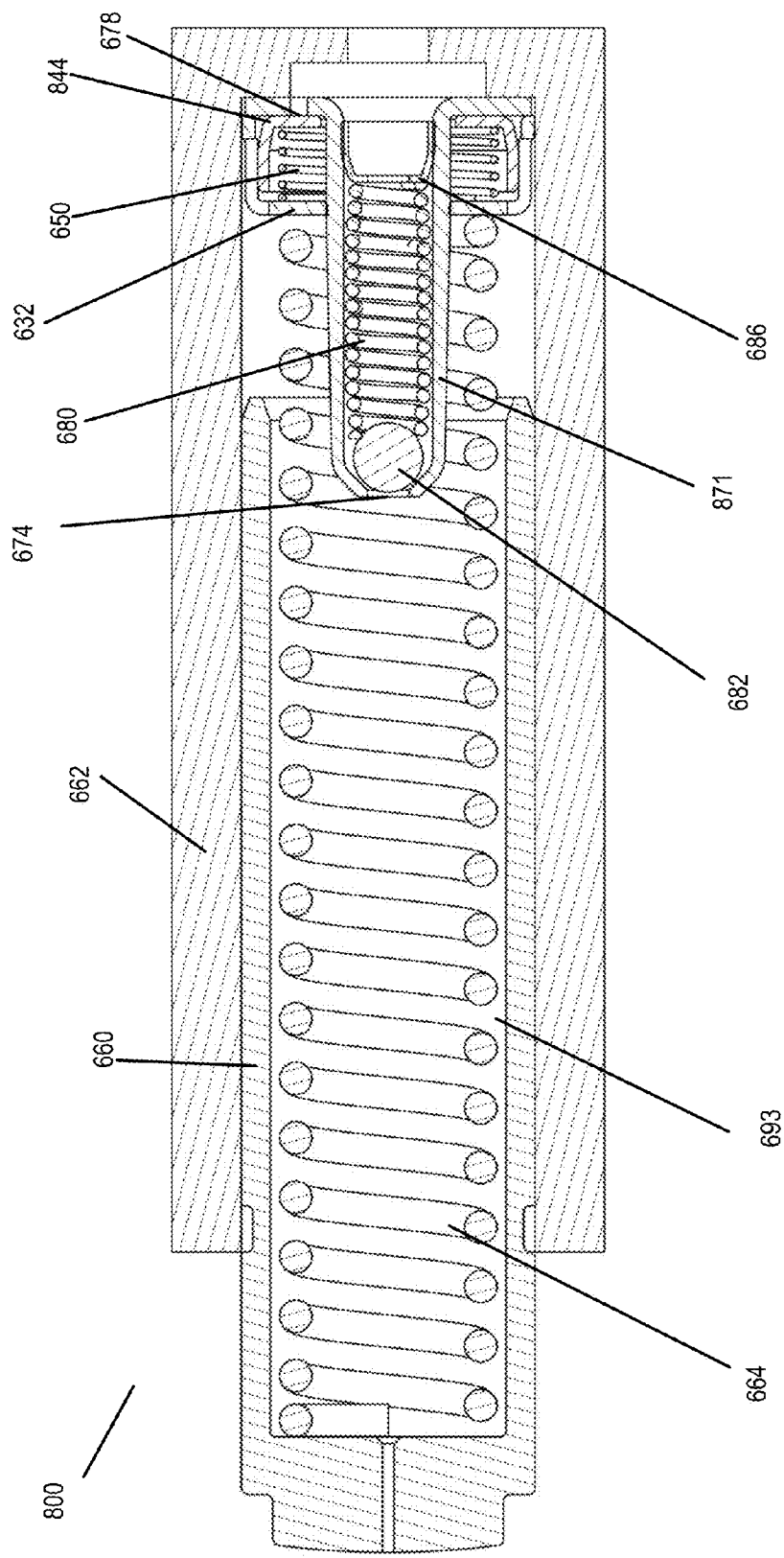
FIG. 38 shows the tensioner of FIG. 35 with the pressure relief valve half open.

FIG. 38 shows the tensioner 800 with the pressure relief valve half open, permitting some back flow.

Figure 39:
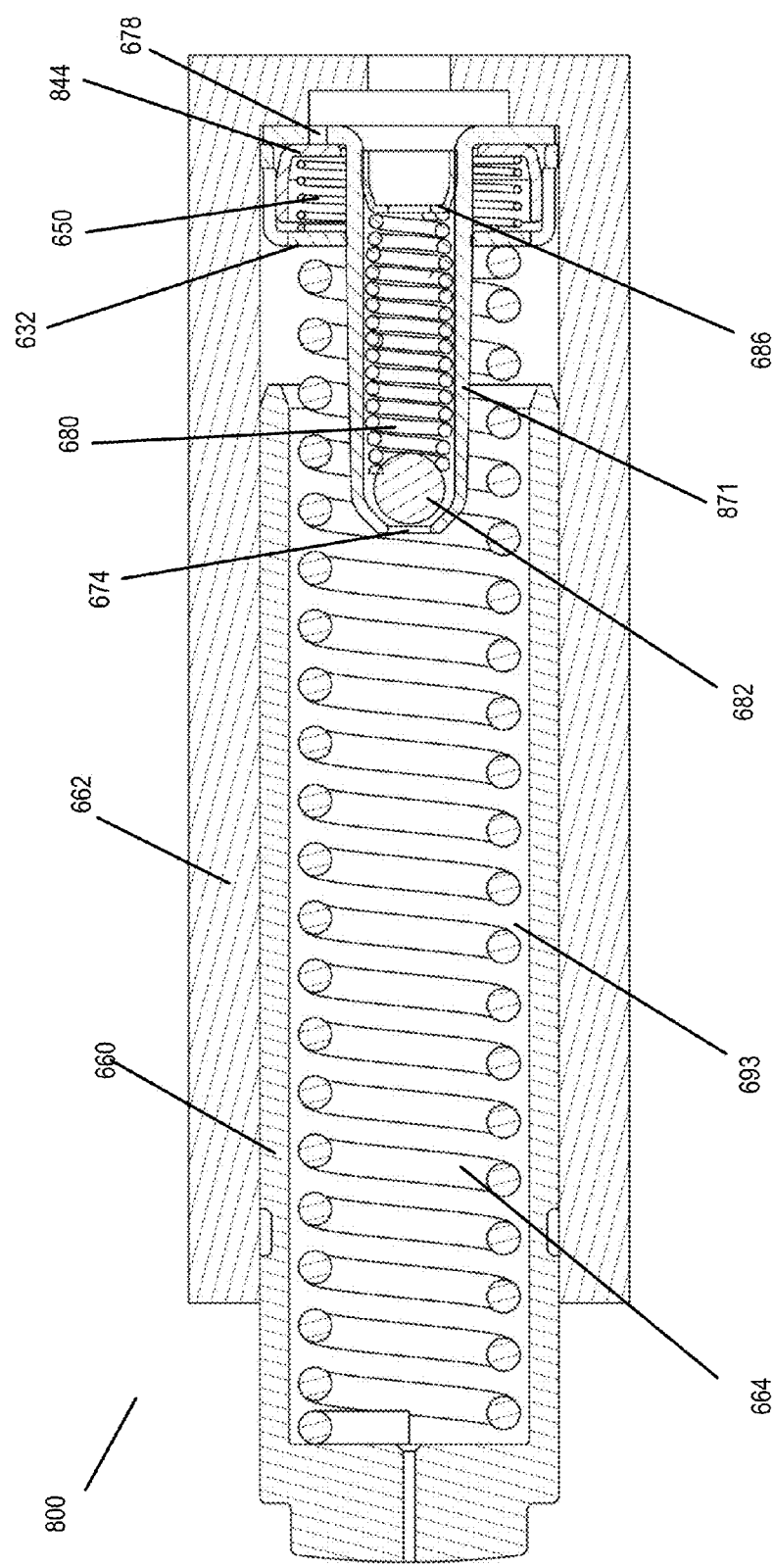
FIG. 39 shows the tensioner of FIG. 35 with the pressure relief valve fully open.

FIG. 39 shows the tensioner 800 with the pressure relief valve fully open, permitting maximum backflow and pressure relief from the hydraulic pressure chamber 693.

The disk check valve 844 in this embodiment is similar to a high flow check valve. It is flipped in relation to the spring retainer compared to the embodiment of FIGS. 28-33.

The embodiment in FIGS. 34-39 may include any shape valve sealing surface, including those shown in FIGS. 10-13.

Although a single disk 844 is shown in FIGS. 34-39, more than one disk may be included in the valve shown in this embodiment. For example, a plurality of disk valves 144, 244 as shown in FIGS. 1-2 could be used.

The integrated check valves described herein preferably decrease space. For example, in some embodiments, the spring set height is decreased from 20 mm to 8 mm.

All patent and nonpatent references discussed herein are hereby incorporated by reference in their entireties.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An integrated check valve with pressure relief for a hydraulic tensioner, comprising:
    a) a backflow pressure relief valve mechanism comprising:
        a hollow pressure relief body defining a chamber, the pressure relief body having a first end with an aperture, a second end, and a length extending from a bottom portion, the bottom portion defining at least one hole;
        a valve member received in the first end of the chamber;
        a pressure relief retainer received in the second end of the chamber; and
        a first biasing member received in the chamber having a second end contacting the pressure relief retainer and a first end contacting the valve member, the first biasing member biasing the valve member to a position in which the valve member seals the aperture of the pressure relief body; and
    b) a forward flow check valve mechanism comprising:
        a check valve retainer surrounding a portion of the length of the hollow pressure relief body comprising a retainer sidewall with through holes and a retainer top wall, wherein the check valve retainer defines a cavity between the pressure relief valve body and the check valve retainer;
        at least one disk check valve received within the cavity and extending along the retainer sidewall and a portion of the length of the pressure relief body; and
        a second biasing member received in the cavity and located between the disk check valve and the pressure relief body.

2. The integrated check valve with pressure relief of claim 1, further comprising a vent seal adjacent the back flow pressure relief valve mechanism defining a plurality of holes to permit forward and back flow of pressurized fluid.

3. The integrated check valve with pressure relief of claim 2, wherein the check valve mechanism provides forward flow of pressurized fluid through the integrated check valve such that fluid flows from a source through the at least one hole in the bottom portion of the hollow pressure relief body and through the through holes of the retainer sidewall and the pressure relief valve mechanism provides back flow through the integrated check valve such that fluid is relieved by flowing through the aperture of the pressure relief body, moving the valve member against the first biasing member and flowing through the chamber and out the vent seal.

4. The integrated check valve with pressure relief of claim 1, wherein at least one first hole defined by the hollow pressure relief valve body or the disk check valve permits back flow of pressurized fluid.

5. The integrated check valve with pressure relief of claim 4, wherein the check valve mechanism provides forward flow of pressurized fluid through the integrated check valve such that fluid flows from a source through at least one second hole in a side of the hollow pressure relief body and through the through holes of the check valve retainer and the pressure relief valve mechanism provides back flow through the integrated check valve such that fluid is relieved by flowing through the aperture of the pressure relief body, moving the valve member against the biasing member and flowing through the chamber and out the first hole.

6. An integrated check valve with pressure relief for a hydraulic tensioner, the integrated check valve comprising:
   a) a backflow pressure relief valve mechanism comprising:
      a hollow pressure relief body defining a chamber, the pressure relief body having a first end with an aperture, a second end, and a length extending from a bottom portion, the bottom portion defining at least one hole;
      a valve member received in the first end of the chamber;
      a pressure relief retainer received in the second end of the chamber; and
      a first biasing member received in the chamber having a second end contacting the pressure relief retainer and a first end contacting the valve member, the first biasing member biasing the valve member to a position in which the valve member seals the aperture of the pressure relief body; and
   b) a forward flow check valve mechanism comprising:
      a check valve retainer surrounding a portion of the length of the hollow pressure relief body comprising a retainer sidewall with through holes and a retainer top wall, wherein the check valve retainer defines a cavity between the pressure relief valve body and the check valve retainer;
      at least one disk check valve received within the cavity and extending along a portion of the length of the pressure relief body; and
      a second biasing member received in the cavity and located between the retainer sidewall and the disk check valve.

7. The integrated check valve with pressure relief of claim 6, further comprising a vent seal adjacent the back flow pressure relief valve mechanism defining a plurality of holes to permit forward and back flow of pressurized fluid.

8. The integrated check valve with pressure relief of claim 7, wherein the check valve mechanism provides forward flow of pressurized fluid through the integrated check valve such that fluid flows from a source through the at least one hole in the bottom portion of the hollow pressure relief body and through the through holes of the retainer sidewall and the pressure relief valve mechanism provides back flow through the integrated check valve such that fluid is relieved by flowing through the aperture of the pressure relief body, moving the valve member against the first biasing member and flowing through the chamber and out the vent seal.

9. The integrated check valve with pressure relief of claim 6, wherein at least one first hole defined by the hollow pressure relief valve body or the disk check valve permits back flow of pressurized fluid.

10. The integrated check valve with pressure relief of claim 9, wherein the check valve mechanism provides forward flow of pressurized fluid through the integrated check valve such that fluid flows from a source through at least one second hole in a side of the hollow pressure relief body and through the through holes of the check valve retainer and the pressure relief valve mechanism provides back flow through the integrated check valve such that fluid is relieved by flowing through the aperture of the pressure relief body, moving the valve member against the biasing member and flowing through the chamber and out the first hole.

11. A hydraulic tensioner for an endless loop, flexible, power transmission device for an internal combustion engine of a motor vehicle, comprising:
   a housing having a bore, the bore having an inner surface, the housing having a closed end with an inlet in communication with a source of pressurized fluid;
   a hollow piston slidably received within the bore, the piston having an inner surface and an outer surface;
   a piston spring biasing the piston in a direction toward the power transmission device;
   a hydraulic pressure chamber formed between the inner surface of the bore, the inner surface of the hollow piston; and
   an integrated check valve in a body of the housing seated above the closed end and inlet, comprising:
      a pressure relief valve mechanism comprising:
         a hollow pressure relief body defining a chamber, the pressure relief body having a first end with an aperture, a second end, and a length extending from a bottom portion, the bottom portion defining at least one hole;
         a valve member received in the first end of the chamber;
         a pressure relief retainer received in the second end of the chamber; and
         a first biasing member received in the chamber having a second end contacting the pressure relief retainer and a first end contacting the valve, the first biasing member biasing the valve member to a position in which the valve member seals the aperture of the pressure relief body; and
      a disk check valve mechanism comprising:
         a check valve retainer surrounding a portion of the length of the hollow pressure relief body comprising a retainer sidewall with through holes and a retainer top wall, wherein the check valve retainer defines a cavity between the pressure relief valve body and the check valve retainer;
         at least one disk check valve received within the cavity and extending along the retainer sidewall and a portion of the length of the pressure relief body; and
         a second biasing member received in the cavity and located between the disk check valve and the pressure relief body;
   wherein the pressure relief valve mechanism permits transfer of pressurized fluid from the hydraulic pressure chamber to the source of pressurized fluid and the disk check valve mechanism permits transfer of pressurized fluid from the source of pressurized fluid to the hydraulic pressure chamber.

12. The hydraulic tensioner of claim 11, wherein the integrated check valve further comprises a vent seal adjacent the back flow pressure relief valve mechanism defining a plurality of holes to permit forward and back flow of pressurized fluid.

13. The hydraulic tensioner of claim 11, wherein at least one first hole defined by the hollow pressure relief valve body or the disk check valve permits back flow of pressurized fluid.

14. A hydraulic tensioner for an endless loop, flexible, power transmission device for an internal combustion engine of a motor vehicle, comprising:
  a housing having a bore, the bore having an inner surface, the housing having a closed end with an inlet in communication with a source of pressurized fluid;
  a hollow piston slidably received within the bore, the piston having an inner surface and an outer surface;
  a piston spring biasing the piston in a direction toward the power transmission device;
  a hydraulic pressure chamber formed between the inner surface of the bore, the inner surface of the hollow piston; and
  an integrated check valve in a body of the housing seated above the closed end and inlet, comprising:
    a) the pressure relief valve mechanism comprising:
      a hollow pressure relief body defining a chamber, the pressure relief body having a first end with an aperture, a second end, and a length extending from a bottom portion, the bottom portion defining at least one hole;
      a valve member received in the first end of the chamber;
      a pressure relief retainer received in the second end of the chamber; and
      a first biasing member received in the chamber having a second end contacting the pressure relief retainer and a first end contacting the valve, the first biasing member biasing the valve member to a position in which the valve member seals the aperture of the pressure relief body;
    b) the forward flow check valve mechanism comprising:
      a check valve retainer surrounding a portion of the length of the hollow pressure relief body comprising a retainer sidewall with through holes and a retainer top wall, wherein the check valve retainer defines a cavity between the pressure relief valve body and the check valve retainer;
      at least one disk check valve received within the cavity and extending along a portion of the length of the pressure relief body;
      a second biasing member received in the cavity and located between the retainer sidewall and the disk check valve; and
    c) a vent seal adjacent the back flow pressure relief valve mechanism defining a plurality of holes to permit forward and back flow of pressurized fluid;
  wherein the pressure relief valve mechanism permits transfer of pressurized fluid from the hydraulic pressure chamber to the source of pressurized fluid and the forward flow check valve mechanism permits transfer of pressurized fluid from the source of pressurized fluid to the hydraulic pressure chamber.

15. The hydraulic tensioner of claim 14, wherein the integrated check valve further comprises a vent seal adjacent the back flow pressure relief valve mechanism defining a plurality of holes to permit forward and back flow of pressurized fluid.

16. The hydraulic tensioner of claim 14, wherein at least one first hole defined by the hollow pressure relief valve body or the disk check valve permits back flow of pressurized fluid.

17. The hydraulic tensioner of claim 11, wherein the disk check valve mechanism provides forward flow of pressurized fluid through the integrated check valve and the pressure relief valve mechanism provides back flow through the integrated check valve.

18. A hydraulic tensioner for an endless loop, flexible, power transmission device for an internal combustion engine of a motor vehicle, comprising:
  a housing having an inlet in communication with a source of pressurized fluid and a bore;
  a hollow piston slidably received within the bore;
  a piston spring disposed within the piston and biasing the piston in a direction toward the power transmission device;
  a hydraulic pressure chamber formed within the hollow piston; and
  an integrated check valve seated in the bore of the housing, comprising:
    a pressure relief valve member including a body defining a chamber therein, the body including a first end having an aperture therethrough and a second end extending outwardly away from the body and having at least one hole therethrough; and
    a disk check valve mechanism including a disk check valve member surrounding a circumference of the pressure relief valve body and extending outward over and contacting the second end of the pressure relief valve body, a disk check valve spring retainer surrounding a circumference of the pressure relief valve body and disposed over the disk check valve member and in contact with outer ends of the second end of the pressure relief valve body, and a disk check valve biasing member disposed between the disk check valve member and the disk check valve spring retainer;
  wherein the pressure relief valve member permits transfer of pressurized fluid from the hydraulic pressure chamber to the source of pressurized fluid and the disk check valve mechanism permits transfer of pressurized fluid from the source of pressurized fluid to the hydraulic pressure chamber.

\* \* \* \* \*